United States Patent
Ishikawa et al.

(10) Patent No.: US 8,784,251 B2
(45) Date of Patent: Jul. 22, 2014

(54) HYDRAULIC CONTROL DEVICE

(75) Inventors: Tomomi Ishikawa, Anjo (JP); Koji Makino, Anjo (JP); Kenichi Tsuchida, Anjo (JP); Naoyuki Fukaya, Anjo (JP); Kazunori Ishikawa, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 0 days.

(21) Appl. No.: 13/984,075

(22) PCT Filed: Feb. 28, 2012

(86) PCT No.: PCT/JP2012/054993
§ 371 (c)(1),
(2), (4) Date: Aug. 7, 2013

(87) PCT Pub. No.: WO2012/132717
PCT Pub. Date: Oct. 4, 2012

(65) Prior Publication Data
US 2014/0014208 A1    Jan. 16, 2014

(30) Foreign Application Priority Data
Mar. 30, 2011    (JP) .................................. 2011-074004

(51) Int. Cl.
*F16H 31/00*    (2006.01)
(52) U.S. Cl.
USPC ...................................................... 475/116
(58) Field of Classification Search
USPC ........... 475/116, 129; 137/628; 477/121, 138, 477/145, 146, 150, 158, 164, 130, 143, 156, 477/127, 128
See application file for complete search history.

(56) References Cited

U.S. PATENT DOCUMENTS

| | | | | |
|---|---|---|---|---|
| 4,462,280 A | * | 7/1984 | Sugano et al. | 475/131 |
| 5,816,977 A | | 10/1998 | Yasue et al. | |
| 5,899,831 A | * | 5/1999 | Takiguchi | 477/151 |
| 7,749,122 B2 | * | 7/2010 | Yoneyama | 475/116 |
| 2001/0036878 A1 | * | 11/2001 | Itou et al. | 475/116 |
| 2003/0004026 A1 | * | 1/2003 | Itou et al. | 475/116 |
| 2006/0169338 A1 | | 8/2006 | Takagi | |
| 2010/0081545 A1 | | 4/2010 | Shimizu et al. | |

FOREIGN PATENT DOCUMENTS

| | | |
|---|---|---|
| JP | 09-317874 A | 12/1997 |
| JP | 2006-207742 A | 8/2006 |
| JP | 2010-084855 A | 4/2010 |

* cited by examiner

*Primary Examiner* — David D Le
*Assistant Examiner* — David J Hlavka
(74) *Attorney, Agent, or Firm* — Sughrue Mion, PLLC

(57) ABSTRACT

A C1 switching valve 80 establishes a first supply state, in which a C1 solenoid pressure Pslc1 can be supplied to a clutch C1, when a line pressure PL is supplied as a holding pressure, and when a modulator pressure Pmod is supplied as a holding pressure and a B1 solenoid pressure Pslb1 is not supplied. The C1 switching valve 80 establishes a second supply state, in which the line pressure PL can be supplied to the clutch C1, when the modulator pressure Pmod is supplied as a holding pressure and the B1 solenoid pressure Pslb1 is supplied. The C1 switching valve 80 is supplied with the modulator pressure Pmod as a holding pressure when an abnormality occurs in supply of the C1 solenoid pressure Pslc1.

8 Claims, 5 Drawing Sheets

|  |  | C-1 | C-2 | C-3 | B-1 | B-3 | F-2 |
|---|---|---|---|---|---|---|---|
|  | P |  |  |  |  |  |  |
|  | REV |  |  | O |  | O |  |
|  | N |  |  |  |  |  |  |
| D | 1st | O |  |  |  | ● | O |
|  | 2nd | O |  |  | O |  |  |
|  | 3rd | O | O |  |  |  |  |
|  | 4th |  | O |  | O |  |  |

※ O: ENGAGED, ●: ENGAGED WITH ENGINE BRAKE IN OPERATION

HYDRAULIC CONTROL DEVICE

INCORPORATION BY REFERENCE

This application is a National Stage of International Application No. PCT/JP2012/054993 filed Feb. 28, 2012, disclosure of Japanese Patent Application No. 2011-074004 filed on Mar. 30, 2011 including the specification, drawings and abstract is incorporated herein by reference in its entirety.

BACKGROUND OF THE INVENTION

The present invention relates to a hydraulic control device for a speed change device capable of transferring power applied to an input member to an output member at a speed change ratio that is changeable in a plurality of stages by engaging and disengaging a plurality of hydraulic friction engagement elements.

DESCRIPTION OF THE RELATED ART

Hitherto, there has been known a hydraulic control device including a first solenoid valve capable of supplying a first hydraulic pressure to a first friction engagement element, a second solenoid valve capable of supplying a second hydraulic pressure to a second friction engagement element, and a third solenoid valve capable of supplying a third hydraulic pressure to a third friction engagement element, in which the second friction engagement element is engaged at higher shift speeds, a low shift speed which is one of lower shift speeds is established through engagement of the first friction engagement element and the third friction engagement element, and a high shift speed which is one of the higher shift speeds is established through engagement of the second friction engagement element and the third friction engagement element (see Japanese Patent Application Publication No. 2010-84855 (JP 2010-84855 A), for example). In the hydraulic control device, the first to third solenoid valves are of a normally closed type, and thus do not output the first to third hydraulic pressures when the solenoid valves are not energized. The hydraulic control device also includes a solenoid valve of a normally open type that is energized during normal travel and that outputs a signal hydraulic pressure when the solenoid valve is not energized, a preliminary shift speed switching valve that is switched between a lower shift speed position, at which a first preliminary hydraulic pressure (forward range pressure) for the first friction engagement element is output, and a higher shift speed position, at which a second preliminary hydraulic pressure (forward range pressure) for the second friction engagement element is output, in accordance with the state of engagement of the second friction engagement element, and a hydraulic pressure supply switching valve that is switched from a normal-time position, at which the first to third hydraulic pressures may be supplied to the first to third friction engagement elements, respectively, to a failure-time position, at which the first and second preliminary hydraulic pressures may be supplied to the first and second friction engagement elements, respectively, and a line pressure may be supplied to the third friction engagement element, during a failure in which the solenoid valve outputs the signal hydraulic pressure (not energized).

SUMMARY OF THE INVENTION

In the hydraulic control device according to the related art described above, the hydraulic pressure supply switching valve is switched to the failure-time position when the solenoid valve which outputs the signal hydraulic pressure is not energized, even if the first solenoid valve or the second solenoid valve is energized. In such a case, the first preliminary hydraulic pressure or the second preliminary hydraulic pressure is supplied to the first friction engagement element or the second friction engagement element even if the first solenoid valve or the second solenoid valve can supply a hydraulic pressure to the first friction engagement element or the second friction engagement element, which may cause a shock along with switching in supplied hydraulic pressure.

Thus, it is a main object of the hydraulic control device according to the present invention to enable a hydraulic pressure from an alternative hydraulic pressure source to be supplied to a hydraulic friction engagement element corresponding to a pressure regulation valve during an abnormality in which a hydraulic pressure is not supplied from the pressure regulation valve as normal, and not to allow the hydraulic pressure from the alternative hydraulic pressure source to be supplied to the hydraulic friction engagement element when a hydraulic pressure is supplied from the pressure regulation valve as normal.

In order to achieve the foregoing main object, the hydraulic control device according to the present invention adopts the following means.

An aspect of the present invention provides
  a hydraulic control device for a speed change device capable of transferring power applied to an input member to an output member at a speed change ratio that is changeable in a plurality of stages by engaging and disengaging a plurality of hydraulic friction engagement elements, the hydraulic control device characterized by including:
  a first pressure regulation valve that regulates a hydraulic pressure to be supplied to a first hydraulic friction engagement element;
  a second pressure regulation valve that regulates a hydraulic pressure to be supplied to a second hydraulic friction engagement element;
  a line pressure generation valve that regulates a hydraulic pressure from a hydraulic pressure generation source to generate a line pressure; and
  a switching valve that can establish a first supply state, in which the hydraulic pressure from the first pressure regulation valve can be supplied to the first hydraulic friction engagement element when the first pressure regulation valve is normal, and that can establish a second supply state, in which the line pressure from the line pressure generation valve can be supplied to the first hydraulic friction engagement element during an abnormality in which a hydraulic pressure is not supplied from the first pressure regulation valve as normal, wherein
  the switching valve is selectively supplied with a first hydraulic pressure and a second hydraulic pressure that is lower than the first hydraulic pressure as a holding pressure, and supplied with the second hydraulic pressure as the holding pressure and supplied with the hydraulic pressure from the second pressure regulation valve during the abnormality, and
  the switching valve establishes the first supply state, irrespective of presence or absence of the hydraulic pressure from the second pressure regulation valve, when the first hydraulic pressure is supplied as the holding pressure, establishes the first supply state when the second hydraulic pressure is supplied as the holding pressure and the hydraulic pressure from the second pressure regulation valve is not supplied, and establishes the second supply state when the second hydraulic pressure is supplied as the holding pressure and the hydraulic pressure from the second pressure regulation valve is supplied.

The hydraulic control device includes the switching valve which can establish the first supply state, in which the hydraulic pressure from the first pressure regulation valve can be supplied to the first hydraulic friction engagement element when the first pressure regulation valve is normal, and which can establish the second supply state, in which the line pressure from the line pressure generation valve can be supplied to the first hydraulic friction engagement element during an abnormality in which a hydraulic pressure is not supplied from the first pressure regulation valve as normal, and the switching valve is selectively supplied with the first hydraulic pressure and the second hydraulic pressure which is lower than the first hydraulic pressure as a holding pressure, and supplied with the second hydraulic pressure as the holding pressure and supplied with the hydraulic pressure from the second pressure regulation valve during the abnormality. The switching valve establishes the first supply state, irrespective of the presence or absence of the hydraulic pressure from the second pressure regulation valve, when the first hydraulic pressure is supplied as the holding pressure, establishes the first supply state when the second hydraulic pressure is supplied as the holding pressure and the hydraulic pressure from the second pressure regulation valve is not supplied, and establishes the second supply state when the second hydraulic pressure is supplied as the holding pressure and the hydraulic pressure from the second pressure regulation valve is supplied.

By thus supplying the second hydraulic pressure, which is lower than the first hydraulic pressure, as a holding pressure to the switching valve during the abnormality described above, the switching valve can be quickly switched from the first supply state into the second supply state by the hydraulic pressure from the second pressure regulation valve to supply the line pressure from the line pressure generation valve to the first hydraulic friction engagement element, which enables simultaneous engagement of the first hydraulic friction engagement element and the second hydraulic friction engagement element. If the first hydraulic pressure is supplied as a holding pressure to the switching valve when the hydraulic pressure is supplied from the first pressure regulation valve as normal, the switching valve is maintained in the first supply state irrespective of the presence or absence of the hydraulic pressure from the second pressure regulation valve, and the switching valve is maintained in the first supply state even if the second hydraulic pressure is supplied as a holding pressure unless the hydraulic pressure from the second pressure regulation valve is supplied. Thus, with the hydraulic control device, it is possible to supply the line pressure from the line pressure generation valve to the first hydraulic friction engagement element corresponding to the first pressure regulation valve during an abnormality in which a hydraulic pressure is not supplied from the first pressure regulation valve as normal, and not to supply the line pressure from the line pressure generation valve to the first hydraulic friction engagement element when the hydraulic pressure is supplied from the first pressure regulation valve as normal. As a result, it is possible to favorably suppress occurrence of a shock along with switching in supplied hydraulic pressure by suppressing erroneous supply of the line pressure from the line pressure generation valve to the first hydraulic friction engagement element when the hydraulic pressure is supplied from the first pressure regulation valve as normal.

In addition, the first hydraulic pressure may be the line pressure, and the second hydraulic pressure may be a modulator pressure obtained by reducing the line pressure. Consequently, by supplying the first hydraulic pressure to the switching valve as a holding pressure when a hydraulic pressure is supplied from the first pressure regulation valve as normal, it is possible to more reliably maintain the switching valve in the first supply state, and not to supply the line pressure from the line pressure generation valve to the first hydraulic friction engagement element.

The hydraulic control device may further include: a third pressure regulation valve that regulates a hydraulic pressure to be supplied to a third hydraulic friction engagement element that is normally not engaged at the same time as the second hydraulic friction engagement element; a second switching valve that can establish a blocked/discharge state, in which supply of the hydraulic pressure from the third pressure regulation valve to the third hydraulic friction engagement element is blocked and a hydraulic pressure can be discharged from the third hydraulic friction engagement element, and a communicated state, in which the hydraulic pressure from the third pressure regulation valve can be supplied to the third hydraulic friction engagement element, and that can receive a signal pressure for establishing the blocked/discharge state and the communicated state and a hydraulic pressure from the second pressure regulation valve; a third switching valve that can establish a first state, in which the hydraulic pressure from the third pressure regulation valve can be supplied to a fourth hydraulic friction engagement element that is normally not engaged at the same time as the third hydraulic friction engagement element, and a second state, in which the hydraulic pressure from the third pressure regulation valve can be supplied to the third hydraulic friction engagement element and a hydraulic pressure can be discharged from the fourth hydraulic friction engagement element; and a signal pressure output valve that outputs a signal pressure for switching the third switching valve from the first state into the second state when the hydraulic pressure from the third pressure regulation valve is supplied to the third hydraulic friction engagement element and during the abnormality. In the hydraulic control device, the third switching valve may be able to receive the line pressure and the modulator pressure, and supply the line pressure to the switching valve as the holding pressure and supply the line pressure to the second switching valve as the signal pressure when the first state is established, and may supply the modulator pressure to the switching valve as the holding pressure and supply the modulator pressure to the second switching valve as the signal pressure when the second state is established; and the second switching valve may establish the blocked/discharge state when the line pressure is supplied as the signal pressure, establish the communicated state when the modulator pressure is supplied as the signal pressure, and establish the blocked/discharge state when a hydraulic pressure from the second pressure regulation valve is input in the communicated state.

In the hydraulic control device, during an abnormality in which the hydraulic pressure is not supplied from the first pressure regulation valve as normal, the switching valve establishes the second state using the signal pressure from the signal pressure output valve. Consequently, the hydraulic pressure from the third pressure regulation valve can be supplied to the third hydraulic friction engagement element, and a hydraulic pressure can be discharged from the fourth hydraulic friction engagement element, which allows the modulator pressure to be supplied as a holding pressure from the third switching valve to the switching valve and allows the modulator pressure to be supplied as a signal pressure to the second switching valve. This enables the modulator pressure, which serves as the second hydraulic pressure which is lower than the line pressure serving as the first hydraulic pressure, to be supplied as a holding pressure to the switching valve during the abnormality described above. When the third switching valve establishes the second state, in addition, the hydraulic pressure from the third pressure regulation valve can be supplied to the third hydraulic friction engagement element, and the second switching valve is supplied with the modulator pressure as a signal pressure to establish the communicated state in which the hydraulic pressure from the third pressure regulation valve can be supplied to the third hydraulic friction engagement element. When the hydraulic pressure from the second pressure regulation valve is supplied to the second switching valve in the communicated state, however, the second switching valve establishes the blocked/discharge state in which supply of a hydraulic pressure from the third pressure regulation valve to the third hydraulic friction engagement element is blocked and a hydraulic pressure can be discharged from the third hydraulic friction engagement element. Thus, even if the hydraulic pressure is output from the second pressure regulation valve as a hydraulic pressure is no longer supplied from the first pressure regulation valve as normal, the second hydraulic friction engagement element and the third hydraulic friction engagement element are not engaged at the same time as each other.

Moreover, the switching valve may include a spool disposed so as to be axially movable and capable of establishing the first supply state and the second supply state, and a spring that urges the spool; and the spool may include a first pressure receiving surface that receives an urging force of the spring, a second pressure receiving surface that receives the hydraulic pressure from the second pressure regulation valve, and a holding pressure receiving surface that receives the holding pressure. In the case where the thus configured switching valve is used, the first supply state is established with the thrust applied to the spool by the effect of the first hydraulic pressure (line pressure) on the holding pressure receiving surface exceeding the sum of the thrust applied to the spool by the effect of the hydraulic pressure from the second pressure regulation valve on the second pressure receiving surface and the urging force of the spring applied to the spool, or with the thrust applied to the spool by the effect of the second hydraulic pressure (modulator pressure) on the holding pressure receiving surface exceeding the urging force of the spring applied to the spool. Meanwhile, the second supply state is established with the sum of the thrust applied to the spool by the effect of the hydraulic pressure from the second pressure regulation valve on the second pressure receiving surface and the urging force of the spring applied to the spool exceeding the thrust applied to the spool by the effect of the second hydraulic pressure (modulator pressure) on the holding pressure receiving surface.

Furthermore, the hydraulic pressure from the third pressure regulation valve may be applied to the first pressure receiving surface of the spool when the third switching valve establishes the second state. Consequently, during an abnormality in which the hydraulic pressure is not supplied from the first pressure regulation valve as normal, the hydraulic pressure from the third pressure regulation valve is applied to the first pressure receiving surface of the spool. Thus, the switching valve establishes the second supply state with the sum of the thrust applied to the spool by the effect of the hydraulic pressure from the third pressure regulation valve on the first pressure receiving surface, the thrust applied to the spool by the effect of the hydraulic pressure from the second pressure regulation valve on the second pressure receiving surface, and the urging force of the spring applied to the spool exceeding the thrust applied to the spool by the effect of the second hydraulic pressure (modulator pressure) on the holding pressure receiving surface. Thus, with this configuration, it is possible to reduce the urging force (rigidity) required for the spring when the switching valve is brought into the second supply state, which allows the switching valve to be more reliably maintained in the first supply state by the first hydraulic pressure (line pressure) or the second hydraulic pressure (modulator pressure) supplied as a holding pressure to the switching valve when the hydraulic pressure is supplied from the first pressure regulation valve as normal.

In addition, the first hydraulic friction engagement element may be engaged at least when the first speed and the second speed are established in the speed change device; and the second hydraulic friction engagement element may be engaged at least when the second speed is established in the speed change device. Thus, during an abnormality in which the hydraulic pressure is not supplied from the first pressure regulation valve as normal, start and forward travel of the vehicle at the second speed can be ensured by engaging the first hydraulic friction engagement element using the line pressure from the line pressure generation valve, and engaging the second hydraulic friction engagement element.

The hydraulic control device may further include a second hydraulic pressure generation source driven by electric power; the hydraulic pressure generation source may be a mechanical pump driven by power from a motor; the first pressure regulation valve may regulate the line pressure from the line pressure generation valve to generate the hydraulic pressure to be supplied to the first hydraulic friction engagement element; the switching valve may be configured to receive a hydraulic pressure from the second hydraulic pressure generation source via a first oil passage, and to supply the hydraulic pressure from the second hydraulic pressure generation source to the first hydraulic friction engagement element when the second supply state is established; and when the switching valve establishes the second supply state, the line pressure from the line pressure generation valve may be supplied to the first hydraulic friction engagement element by way of a second oil passage and the first oil passage, the second oil passage being connected to the first oil passage and having a valve provided in a middle of the second oil passage, the valve being configured to restrict entry of the hydraulic pressure from the second hydraulic pressure generation source.

Consequently, when the hydraulic pressure for the first hydraulic friction engagement element is no longer supplied by the first pressure regulation valve with operation of the motor stopped and with the hydraulic pressure generation source no longer generating a hydraulic pressure, the hydraulic pressure from the second hydraulic pressure generation source can be supplied to the first hydraulic friction engagement element by switching the switching valve into the second supply state and actuating the second hydraulic pressure generation source. In addition, since the line pressure from the line pressure generation valve can be supplied to the first hydraulic friction engagement element utilizing a part of the first oil passage which connects between the second hydraulic pressure generation source and the switching valve, it is possible to suppress an increase in number of oil passages and hence an increase in cost and device size. With the hydraulic control device according to the aspect of the present invention, it is possible to suppress erroneous supply of the line pressure from the line pressure generation valve to the first hydraulic friction engagement element when the hydraulic pressure is supplied from the first pressure regulation valve as normal as discussed above, and thus to favorably suppress application of the line pressure to the second hydraulic pressure generation source via the second oil passage and the first oil passage to adversely affect the second hydraulic pressure generation source when the hydraulic pressure is supplied from the first pressure regulation valve as normal. The valve described above may be a check valve, or an on-off valve controlled so as to be opened and closed.

Moreover, the second hydraulic pressure generation source may be an electric pump driven by electric power or an electromagnetic pump.

DETAILED DESCRIPTION OF THE EMBODIMENTS

Now, an embodiment of the present invention will be described below.

Figure 1:
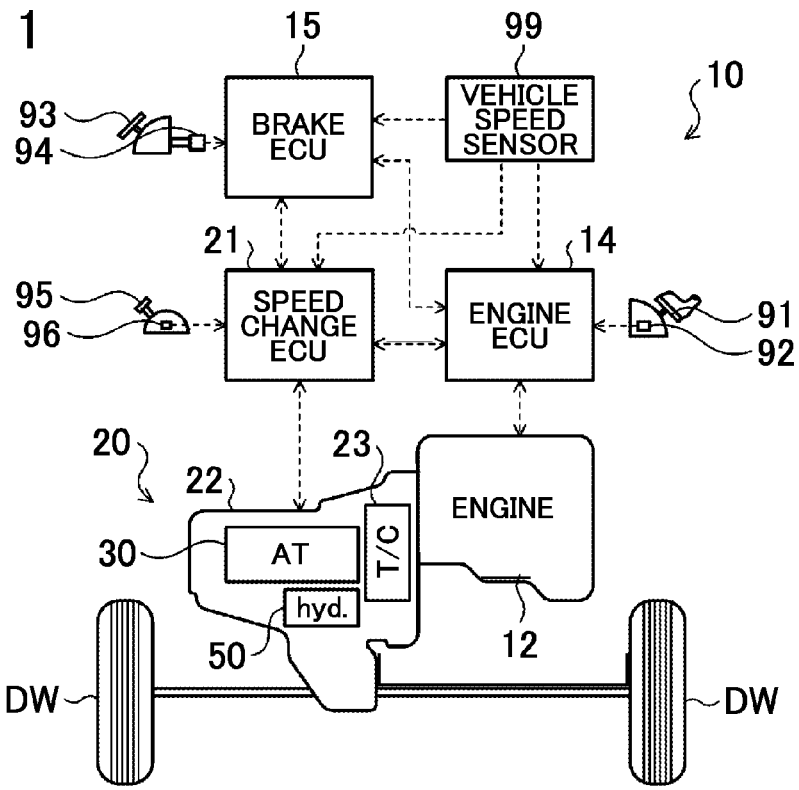
FIG. 1 shows a schematic configuration of an automobile 10 which is a vehicle incorporating a power transfer device 20 including a hydraulic control device 50 according to an embodiment of the present invention.
Figure 2:
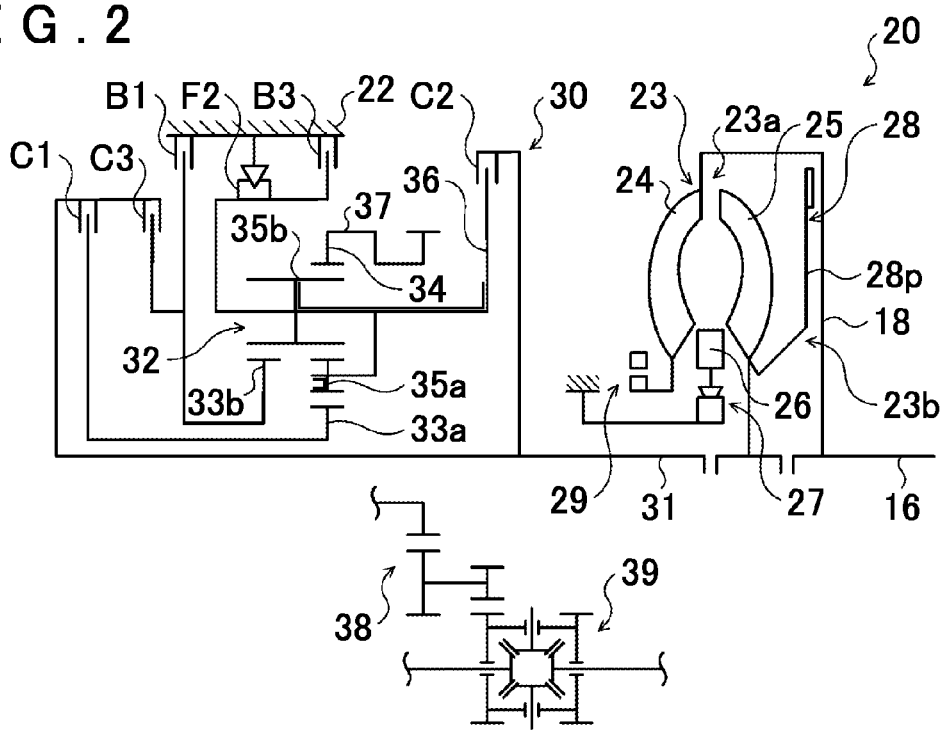
FIG. 2 shows a schematic configuration of the power transfer device 20.

FIG. 1 shows a schematic configuration of an automobile 10 which is a vehicle incorporating a power transfer device 20 including a hydraulic control device 50 according to an embodiment of the present invention. FIG. 2 shows a schematic configuration of the power transfer device 20. The automobile 10 shown in FIG. 1 includes an engine 12 serving as a power generation source which is an internal combustion engine that outputs power through explosive combustion of a mixture of a hydrocarbon fuel, such as gasoline and light oil, and air, an engine electronic control unit (hereinafter referred to as an "engine ECU") 14 that controls the engine 12, a brake electronic control unit (hereinafter referred to as a "brake ECU") 15 that controls an electronically controlled hydraulic brake unit (not shown), and the power transfer device 20 which includes a fluid transmission apparatus (starting device) 23, a stepped automatic transmission 30, the hydraulic control device 50 which supplies and discharges hydraulic oil (a hydraulic fluid) to and from the fluid transmission apparatus 23 and the automatic transmission 30, a speed change electronic control unit (hereinafter referred to as a "speed change ECU") 21 that controls the fluid transmission apparatus 23, the automatic transmission 30, and the hydraulic unit 50, and so forth. The power transfer device 20 is connected to a crankshaft 16 of the engine 12 to transfer power from the engine 12 serving as a power generation source to left and right drive wheels DW.

As shown in FIG. 1, the engine ECU 14 receives inputs such as an accelerator operation amount Acc from an accelerator pedal position sensor 92 that detects the amount of depression (amount of operation) of an accelerator pedal 91, a vehicle speed V from a vehicle speed sensor 99, signals from various sensors such as a crankshaft position sensor (not shown) that detects rotation of the crankshaft 16, and signals from the brake ECU 15 and the speed change ECU 21. The engine ECU 14 controls an electronically controlled throttle valve, a fuel injection valve, an ignition plug, and so forth (none of which is shown) on the basis of the received signals. In addition, the engine electronic control unit 14 according to the embodiment is configured to execute automatic start/stop control (idle stop control) in which operation of the engine 12 is stopped normally when the engine 12 is brought into idle operation as the automobile 10 becomes stationary and in which the engine 12 is restarted in response to a request to start the automobile 10 made by depressing the accelerator pedal 91.

The brake ECU 15 receives inputs such as a master cylinder pressure detected by a master cylinder pressure sensor 94 when a brake pedal 93 is depressed, the vehicle speed V from the vehicle speed sensor 99, signals from various sensors (not shown), and signals from the engine ECU 14 and the speed change ECU 21. The brake ECU 15 controls a brake actuator (hydraulic actuator) (not shown) on the basis of the received signals. The speed change ECU 21 of the power transfer device 20 is housed inside a transmission case 22. The speed change ECU 21 receives inputs such as a shift range SR from a shift range sensor 96 that detects the operation position of a shift lever 95 used to select a desired shift range from a plurality of shift ranges (in the embodiment, a parking range, a reverse range, a neutral range, a drive range, a 2nd-speed range, and an L range), the vehicle speed V from the vehicle speed sensor 99, signals from various sensors (not shown), and signals from the engine ECU 14 and the speed change ECU 15. The speed change ECU 21 controls the fluid transmission apparatus 23, the automatic transmission 30, and so forth on the basis of the received signals.

Each of the engine ECU 14, the brake ECU 15, and the speed change ECU 21 discussed above is formed as a microcomputer including a CPU (not shown) as a main component, and includes a ROM that stores various programs, a RAM that temporarily stores data, input and output ports and a communication port (not shown), and so forth besides the CPU. Moreover, the engine ECU 14, the brake ECU 15, and the speed change ECU 21 are connected to each other via a bus line or the like so that data required for control are exchanged between the ECUs as required.

The power transfer device 20 includes the fluid transmission apparatus 23 housed inside the transmission case 22, an oil pump (mechanical pump) 29 serving as a hydraulic pressure generation source, the automatic transmission 30, and so forth. The fluid transmission device 23 is formed as a fluidic torque converter with a lock-up clutch. As shown in FIG. 2, the fluid transmission device 23 includes a pump impeller 24 connected to the crankshaft 16 of the engine 12 via a front cover 18, a turbine runner 25 fixed to an input shaft (input member) 31 of the automatic transmission 30 via a turbine hub, a stator 26 disposed inside the pump impeller 24 and the turbine runner 25 to rectify the flow of hydraulic oil (ATF) from the turbine runner 25 to the pump impeller 24, a one-way clutch 27 that restricts rotation of the stator 26 to one direction, a lock-up clutch 28 having a damper mechanism (not shown), and so forth. The fluid transmission apparatus 23 functions as a torque amplifier through the action of the stator 26 when the difference in rotational speed between the pump impeller 24 and the turbine runner 25 is large, and functions as a fluid coupling when the difference in rotational speed between the pump impeller 24 and the turbine runner 25 is small. The lock-up clutch 28 can establish and release lock-up in which the front cover 18 and the input shaft 31 of the automatic transmission 30 are directly coupled to each other. If predetermined lock-up on conditions are met after the automobile 10 is started, the lock-up clutch 28 directly couples the front cover 18 and the input shaft 31 of the automatic transmission 30 to each other so that power from the engine 12 is mechanically and directly transferred to the input shaft 31. In this event, variations in torque to be transferred to the input shaft 31 are absorbed by the damper mechanism (not shown).

The lock-up clutch 28 according to the embodiment is configured to establish and release lock-up by varying the pressure in a lock-up chamber 23b that faces, via a lock-up piston 28p, a fluid transmission chamber 23a in which the pump impeller 24 and the turbine runner 25 of the fluid transmission apparatus 23 are disposed. That is, when the pressure in the lock-up chamber 23b is higher than the pressure in the fluid transmission chamber 23a, or when the pressure in the fluid transmission chamber 23a and the pressure in the lock-up chamber 23b are equal to each other, the lock-up piston 28p is not moved to the engagement side, and thereby lock-up is not established (lock-up is released). When a pressure that is lower than the pressure in the fluid transmission chamber 23a is supplied to the inside of the lock-up chamber 23b to lower the pressure in the lock-up chamber 23b, on the contrary, the lock-up piston 28p is moved toward the front cover 18 to bring a friction member into pressure contact with an inner surface of the front cover 18, and thereby lock-up is established (completed).

The oil pump 29 serving as a hydraulic pressure generation source is formed as a gear pump including a pump assembly including a pump body and a pump cover, and an externally toothed gear connected via a hub to the pump impeller 24 of the fluid transmission apparatus 23, and connected to the hydraulic control device 50. When the engine 12 is in operation, power from the engine 12 rotates the externally toothed gear, which causes the oil pump 29 to suck and discharge hydraulic oil reserved in an oil pan via a strainer (both not shown). Thus, during operation of the engine 12, the oil pump 29 can generate a hydraulic pressure required by the fluid transmission apparatus 23 or the automatic transmission 30, and supply hydraulic oil to portions to be lubricated such as various bearings.

The automatic transmission 30 is formed as a 4-speed transmission. As shown in FIG. 2, the automatic transmission 30 includes a Ravigneaux type planetary gear device 32 and a plurality of clutches C1, C2, and C3, two brakes B1 and B3, and a one-way clutch F2 that change a power transfer path from the input side to the output side. The Ravigneaux type planetary gear mechanism 32 includes two sun gears 33a and 33b which are each an externally toothed gear, a ring gear 34 which is an internally toothed gear fixed to an output shaft (output member) 37 of the automatic transmission 30, a plurality of short pinion gears 35a meshed with the sun gear 33a, a plurality of long pinion gears 35b meshed with the sun gear 33b and the plurality of short pinion gears 35a and meshed with the ring gear 34, and a carrier 36 that holds the plurality of short pinion gears 35a and the plurality of long pinion gears 35b, which are coupled to each other, so as to be rotatable about their respective axes and revolvable around a common axis and that is supported by the transmission case 22 via the one-way clutch F2. The output shaft 37 of the automatic transmission 30 is connected to the drive wheels DW via a gear mechanism 38 and a differential mechanism 39.

Figures 3, 4:
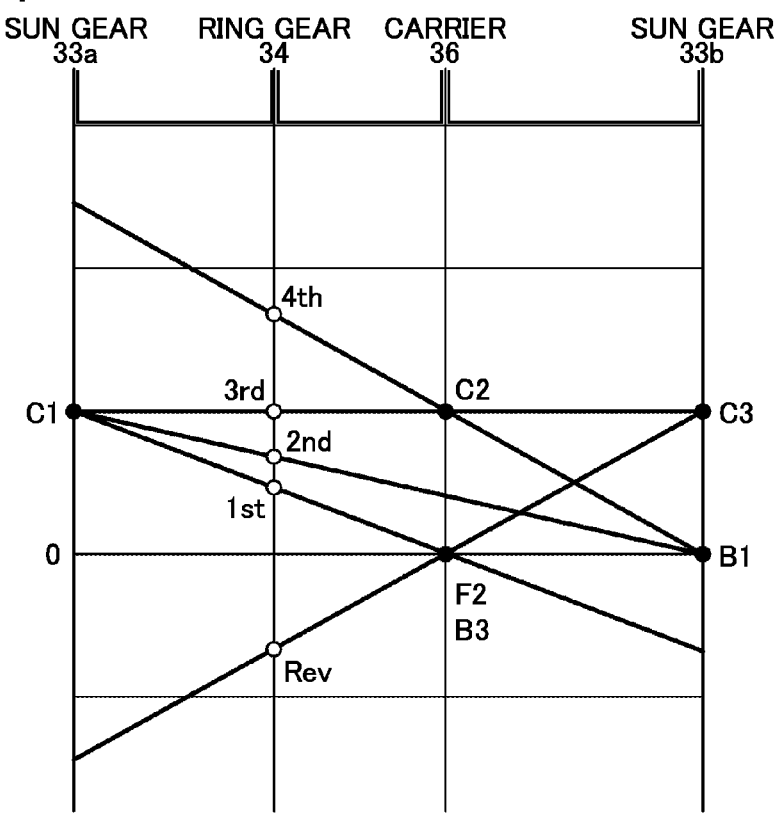
FIG. 3 is an operation table showing the relationship between each shift speed of an automatic transmission 30 included in the power transfer device 20 and the respective operating states of clutches and brakes.
FIG. 4 is a collinear diagram illustrating the relationship between the respective rotational speeds of rotary elements forming the automatic transmission 30.

The clutch C1 is a hydraulic clutch capable of engaging and disengaging the input shaft 31 and the sun gear 33a of the Ravigneaux type planetary gear device 32 with and from each other. The clutch C2 is a hydraulic clutch capable of engaging and disengaging the input shaft 31 and the carrier 36 of the Ravigneaux type planetary gear device 32 with and from each other. The clutch C3 is a hydraulic clutch capable of engaging and disengaging the input shaft 31 and the sun gear 33b of the Ravigneaux type planetary gear device 32 with and from each other. The brake B1 is a hydraulic clutch capable of fixing and unfixing the sun gear 33b of the Ravigneaux type planetary gear device 32 to and from the transmission case 22. The brake B3 is a hydraulic clutch capable of fixing and unfixing the carrier 36 of the Ravigneaux type planetary gear device 32 to and from the transmission case 22. The clutches C1 to C3 and the brakes B1 and B3 operate with hydraulic oil supplied thereto and discharged therefrom by the hydraulic control device 50. FIG. 3 is an operation table showing the relationship between each shift speed of the automatic transmission 30 and the respective operating states of the clutches C1 to C3, the brakes B1 and B3, and the one-way clutch F2. FIG. 4 is a collinear diagram illustrating the relationship between the respective rotational speeds of rotary elements forming the automatic transmission 30. The automatic transmission 30 provides first to fourth forward shift speeds and one reverse shift speed when the clutches C1 to C3 and the brakes B1 and B3 are brought into respective states shown in the operation table of FIG. 3.

Figure 5:
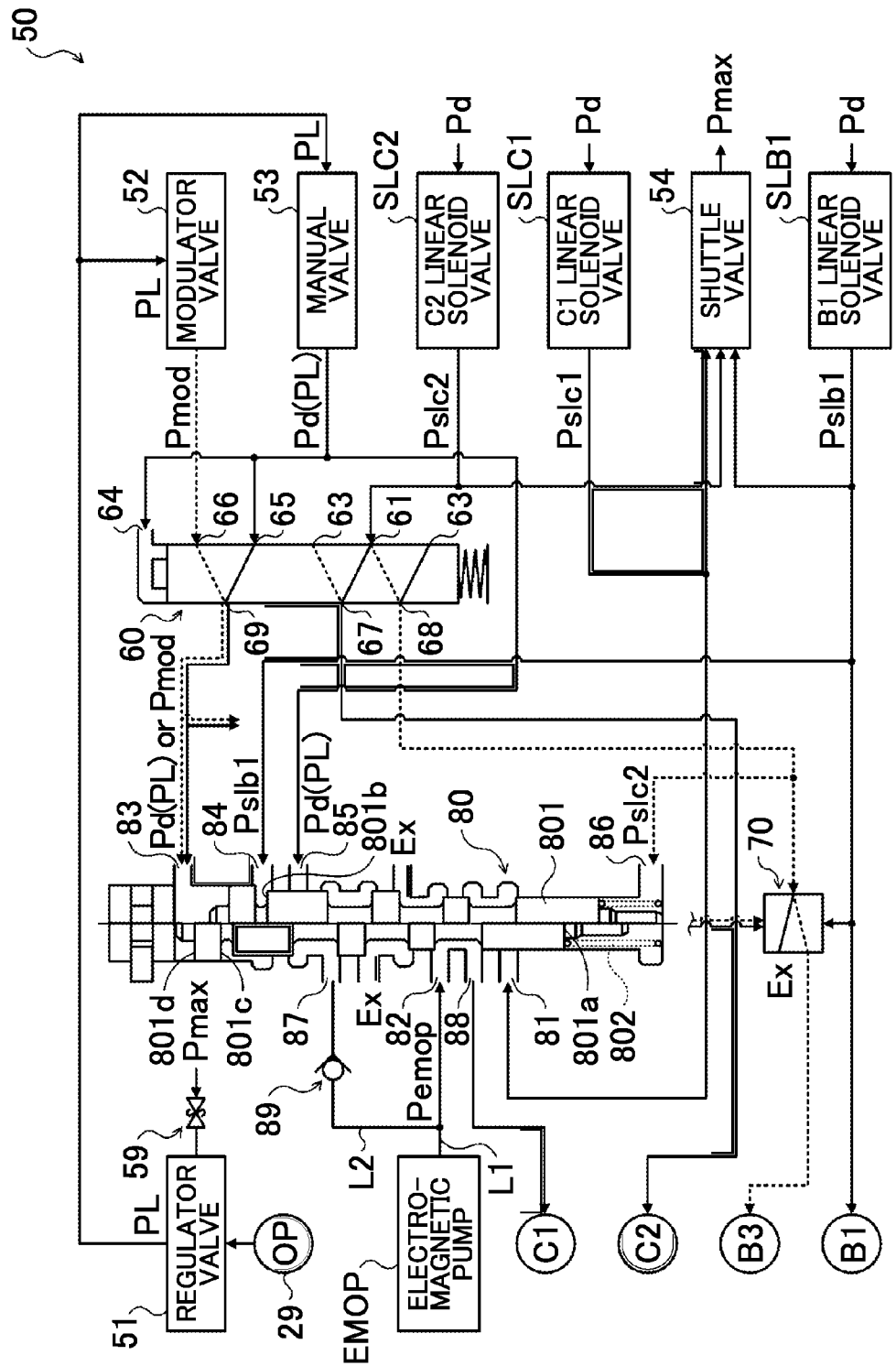
FIG. 5 is a system diagram showing the hydraulic control device 50.
Figure 6:
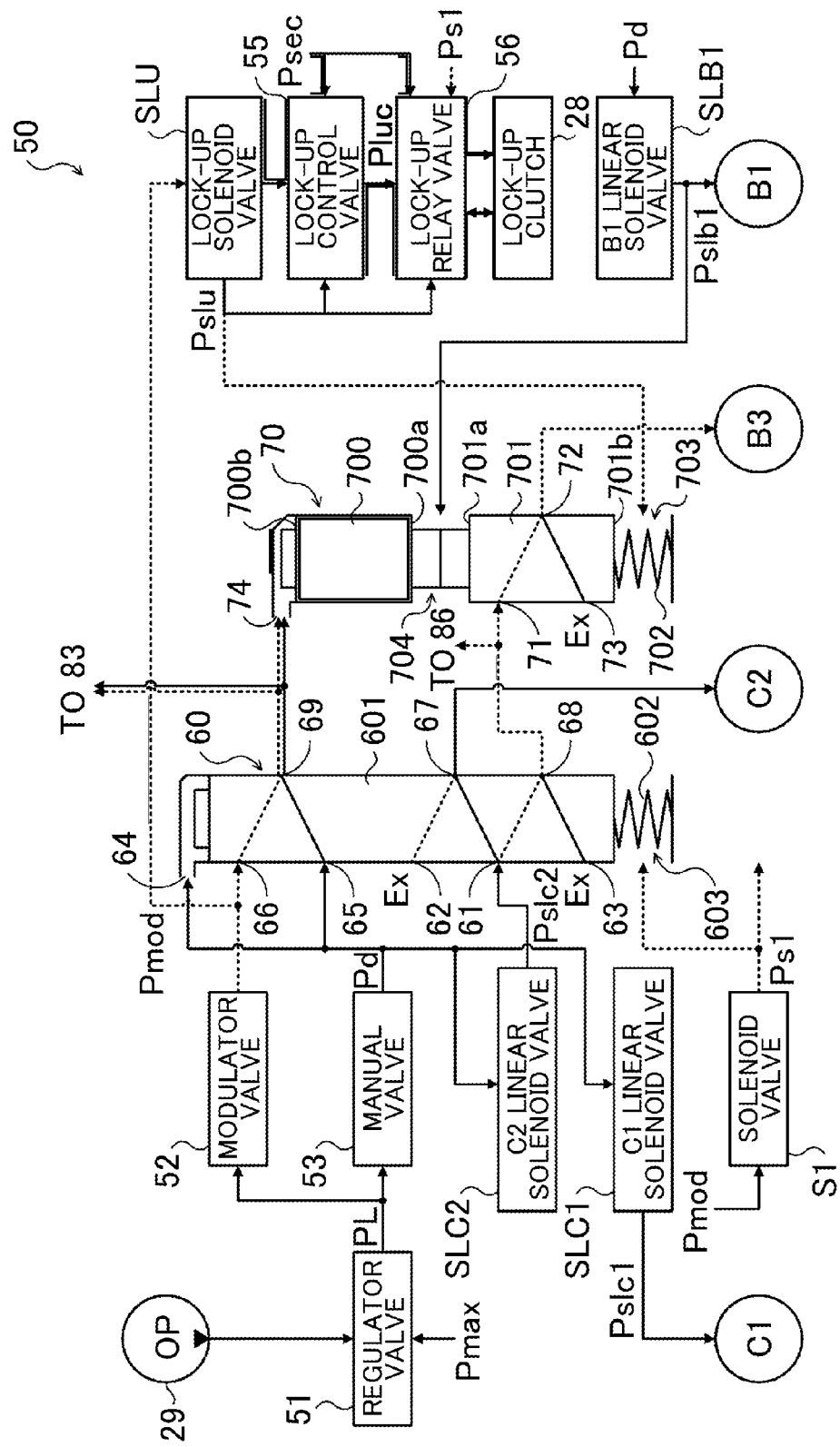
FIG. 6 is a system diagram showing the hydraulic control device 50.

FIGS. 5 and 6 are each a system diagram showing the hydraulic control device 50 which supplies and discharges hydraulic oil to and from the fluid transmission apparatus 23 including the lock-up clutch 28 discussed above and the automatic transmission 30. The hydraulic control device 50 is connected to the oil pump 29 discussed above which is driven by power from the engine 12 to suck and discharge hydraulic oil from the oil pan. As shown in FIG. 5, the hydraulic control device 50 includes a primary regulator valve 51 that regulates the hydraulic oil from the oil pump 29 to generate a line pressure PL, a modulator valve 52 that generates a constant modulator pressure Pmod, a manual valve 53 that switches the supply destination of the line pressure PL from the primary regulator valve 51 in accordance with the operating position of the shift lever 95, a C1 linear solenoid valve SLC1 that regulates the line pressure PL from the manual valve 53 (primary regulator valve 51) to generate a C1 solenoid pressure Pslc1 for the clutch C1, a C2 linear solenoid valve SLC2 that regulates the line pressure PL from the manual valve 53 (primary regulator valve 51) to generate a C2 solenoid pressure Pslc2 for the clutch C2, and a B1 linear solenoid valve SLB1 that regulates the line pressure PL from the manual valve 53 (primary regulator valve 51) to generate a B1 solenoid pressure Pslb1 for the brake B1.

In addition, as shown in FIG. 5, the hydraulic control device 50 according to the embodiment includes a shuttle valve (maximum pressure selection valve) 54 that is connected to respective output ports of the linear solenoid valves SLC1, SLC2, and SLB1 and that outputs a maximum pressure Pmax that is the highest of the C1 solenoid pressure Pslc1, the C2 solenoid pressure Pslc2, and the B1 solenoid pressure Pslb1. Further, as shown in FIG. 6, in order to actuate the lock-up clutch 28 of the fluid transmission apparatus 23, the hydraulic control device 50 includes a lock-up solenoid valve SLU that regulates the modulator pressure Pmod from the modulator valve 52 to generate a lock-up solenoid pressure (lock-up control pressure) Pslu, a lock-up control valve 55 that generates a lock-up pressure Plup to be supplied to the lock-up clutch 28 and corresponding to the lock-up solenoid pressure Pslu from the lock-up solenoid valve SLU, and a lock-up relay valve 56 capable of establishing a lock-up pressure supply state in which the lock-up pressure Plup can be supplied to the lock-up chamber 23b of the fluid transmission apparatus 23 and a lock-up pressure block state in which supply of the lock-up pressure Plup to the lock-up chamber 23b is blocked.

The primary regulator valve 51 receives as a signal pressure the maximum pressure Pmax from the shuttle valve 54 discussed above via a safety valve 59 to generate the line pressure PL corresponding to the maximum pressure Pmax. It should be noted, however, that the primary regulator valve 51 may be driven by a control pressure from a linear solenoid valve (not shown) that regulates the pressure of hydraulic oil from the oil pump 29 side (for example, the modulator valve 52) in accordance with the accelerator operation amount Acc or the operation amount of the throttle valve to output the control pressure. The modulator valve 52 according to the embodiment is a pressure regulation valve that regulates the line pressure PL from the primary regulator valve 51 using the urging force of a spring and a feedback pressure to generate the modulator pressure Pmod which is generally constant.

The manual valve 53 includes a spool that is axially slidable in conjunction with the shift lever 95, an input port to which the line pressure PL is supplied, a drive range output port that communicates with respective input ports of the C1 linear solenoid valve SLC1, the C2 linear solenoid valve SLC2, and the B1 linear solenoid valve SLB1 via an oil passage, a reverse range output port that communicates with a hydraulic pressure entrance of the clutch C3 via an oil passage, and so forth. When a driver selects one of the drive range, the 2nd-speed range, and the L range which are each a forward travel shift range, the spool of the manual valve 53 allows the input port to communicate with only the drive range output port so that the line pressure PL (drive range pressure Pd) is supplied to the C1 linear solenoid valve SLC1, the C2 linear solenoid valve SLC2, and the B1 linear solenoid valve SLB1. When the driver selects the reverse range for reverse travel, the spool of the manual valve 53 allows the input port to communicate with only the reverse range output port so that the line pressure PL (Pr) is supplied to the clutch C3. When the driver selects the parking range or the neutral range, the spool of the manual valve 53 blocks communication between the input port and the drive range output port and the reverse range output port.

The C1 linear solenoid valve SLC1 is a normally open linear solenoid valve that regulates the line pressure PL from the manual valve 53 in accordance with the value of a current applied from an auxiliary battery (not shown) to generate the C1 solenoid pressure Pslc1 to be supplied to the clutch C1. The C2 linear solenoid valve SLC2 is a normally open linear solenoid valve that regulates the line pressure PL from the manual valve 53 in accordance with the value of a current applied from the auxiliary battery (not shown) to generate the C2 solenoid pressure Pslc2 to be supplied to the clutch C2. The B1 linear solenoid valve SLB1 is a normally closed linear solenoid valve that regulates the line pressure PL from the manual valve 53 in accordance with the value of a current applied from the auxiliary battery (not shown) to generate the B1 solenoid pressure Pslb1 to be supplied to the brake B1.

The linear solenoid valves SLC1, SLC2, and SLB1 (respective currents applied thereto) are each controlled by the speed change ECU 21. In the embodiment, from the viewpoint of the cost and the ease of design, the linear solenoid valves SLC1, SLC2, and SLB1 have the same size and the same maximum output pressure. In the automatic transmission 30 according to the embodiment, further, the torque distribution ratio of the brake B1 which is engaged to establish one of the second speed and the fourth speed is lower than the torque distribution ratio of the clutch C1 which is engaged together with the brake B1 to establish the second speed and the clutch C2 which is engaged together with the brake B1 to establish the fourth speed. Thus, during travel of the automobile 10, the output pressure required for the B1 linear solenoid valve SLB1 corresponding to the brake B1 is lower than the output pressure required for the C1 linear solenoid valve SLC1 corresponding to the clutch C1 and the C2 linear solenoid valve SLC2 corresponding to the clutch C2. Consequently, the maximum output pressure is not required for the B1 linear solenoid valve SLB1 during normal travel of the automobile 10, and the output pressure required for the B1 linear solenoid valve SLB1 falls within a range, the upper limit of which is defined by a normally used upper limit pressure which is sufficiently lower than the maximum output pressure.

In the embodiment, in addition, when friction torque is transferred from the turbine runner 25 side to the output shaft 37 with the first speed established in the automatic transmission 30 (with engine brake at the first speed in operation) as the driver selects the L range, the C2 solenoid pressure Pslc2 from the C2 linear solenoid valve SLC2 corresponding to the clutch C2 which is normally not engaged at the same time as the brake B3 is supplied to the brake B3 which is engaged at the same time as the clutch C1. Therefore, as shown in FIGS. 5 and 6, in order to enable the C2 solenoid pressure Pslc2 from the C2 linear solenoid valve SLC2 to be selectively supplied to the clutch C2 and the brake B3, the hydraulic control device 50 according to the embodiment includes a C2/B3 switching valve 60, a B3 switching valve 70, and a normally closed solenoid valve S1 that is controlled by the speed change ECU 21 and that regulates the modulator pressure Pmod from the modulator valve 52 to output a solenoid pressure Ps1 serving as a signal pressure for the C2/B3 switching valve 60. The B3 switching valve 70 according to the embodiment is configured to have a fail-safe function for suppressing simultaneous engagement of the brake B1, which is normally not engaged at the same time as the brake B3, and the brake B3, and to supply the line pressure PL (Pr) from the manual valve 53 to the brake B3 which is engaged at the same time as the clutch C3 when the reverse range is selected.

Figure 7:
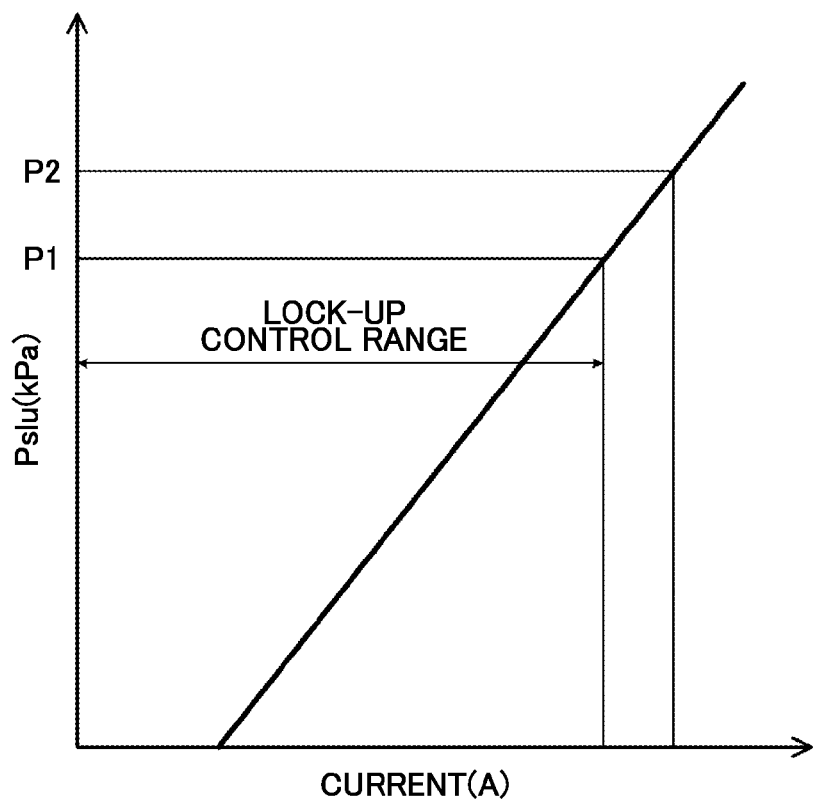
FIG. 7 illustrates the relationship between a current applied to a lock-up solenoid valve SLU and a lock-up solenoid pressure Pslu.

The lock-up solenoid valve SLU regulates the modulator pressure Pmod from the modulator valve 52 in accordance with the value of a current applied from the auxiliary battery (not shown) to generate the lock-up solenoid pressure Pslu, and is controlled by the transmission ECU 21. FIG. 7 shows the relationship between a current applied to the lock-up solenoid valve SLU and the lock-up solenoid pressure Pslu. The lock-up control valve 55 is a spool valve that regulates a secondary pressure Psec from a secondary regulator valve (not shown), which regulates the pressure of hydraulic oil drained from the primary regulator valve 51 so as to be lower than the line pressure PL in accordance with the maximum pressure Pmax, in accordance with the lock-up solenoid pressure Pslu supplied from the lock-up solenoid valve SLU to generate the lock-up pressure Plup for the lock-up clutch 28. The lock-up control valve 55 according to the embodiment generates the lock-up pressure Plup by reducing the secondary pressure Psec which is the source pressure to a greater degree as the lock-up solenoid pressure Pslu from the lock-up solenoid valve SLU is higher, and outputs the lock-up pressure Plup required for complete engagement of the lock-up clutch 28 when the lock-up solenoid pressure Pslu reaches a lock-up clutch complete engagement pressure P1 (see FIG. 7) that is equal to or less than the modulator pressure Pmod.

The lock-up relay valve 56 includes a spool urged by a spring, and receives as a signal pressure the lock-up solenoid pressure Pslu from the lock-up solenoid valve SLU. The lock-up relay valve 56 according to the embodiment is configured to establish the lock-up pressure block state when the lock-up solenoid pressure Pslu is not supplied to allow only supply of the secondary pressure (circulation pressure) Psec from the secondary regulator valve to the lock-up chamber 23b discussed above, and to establish the lock-up pressure supply state when the lock-up solenoid pressure Pslu is supplied to allow supply of the secondary pressure Psec to the fluid transmission chamber 23a and supply of the lock-up pressure Plup to the lock-up chamber 23b. In addition, the lock-up relay valve 56 according to the embodiment is supplied with the solenoid pressure Ps1 from the solenoid valve S1 discussed above. When the solenoid pressure Ps1 from the solenoid valve S1 is input, the lock-up relay valve 56 establishes the lock-up pressure block state to block (prohibit) supply of the lock-up pressure Plup to the lock-up chamber 23b, that is, lock-up.

The hydraulic control device 50 according to the embodiment also includes an electromagnetic pump EMOP used to supply a hydraulic pressure to the clutch C1 serving as a starting clutch to keep the automatic transmission 30 in a start stand-by state when operation of the engine 12 is stopped through the automatic start/stop control (idle stop control) discussed above and the line pressure PL from the primary regulator valve 51 is reduced as operation of the oil pump 29 is stopped, and a C1 switching valve 80 capable of selectively supplying the C1 solenoid pressure Pslc1 from the C1 linear solenoid valve SLC1 and a hydraulic pressure Pemop from the electromagnetic pump EMOP to the clutch C1 (see FIG. 5 for both the electromagnetic pump EMOP and the C1 switching valve 80). In the embodiment, the rotational speed of the engine 12 at which the discharge pressure of the oil pump 29 becomes equal to or less than a predetermined value is determined as a threshold Nref (a value of about 1000 to 1500 rpm, for example). When the rotational speed of the engine 12 becomes equal to or less than the threshold Nref, the C1 switching valve 80 is switched from a first supply state (the state in the right half of FIG. 5), in which the C1 solenoid pressure Pslc1 from the C1 linear solenoid valve SLC1 can be supplied to the clutch C1, into a second supply state (the state in the left half of FIG. 5), in which the hydraulic pressure Pemop from the electromagnetic pump EMOP can be supplied to the clutch C1, and a rectangular-wave current at a predetermined duty ratio is applied to a coil of a solenoid portion of the electromagnetic pump EMOP under control by the speed change electronic control unit 21. Then, when the engine 12 is restarted and the rotational speed of the engine 12 becomes more than the threshold Nref or a predetermined value that is slightly larger than that, supply of a current to the electromagnetic pump EMOP is stopped, and the C1 switching valve 80 is switched from the second supply state into the first supply state.

The electromagnetic pump EMOP has a well-known configuration to suck hydraulic oil from an oil pan and discharge the hydraulic oil to generate a hydraulic pressure as a rectangular-wave current is applied to the coil of the solenoid portion (not shown), and is controlled by the speed change ECU 21. Here, when the engine electronic control unit 14 executes an automatic start/stop control process to stop operation of the engine 12, it is not necessary that the clutch C1 should be maintained in the completely engaged state. Therefore, the electromagnetic pump EMOP used in the embodiment is capable of generating a hydraulic pressure that is about enough to set the clutch C1 to a state immediately before being engaged (immediately before being completely engaged) (about enough to eliminate the stroke of a hydraulic servo) while operation of the engine 12 is stopped. This makes it possible to more adequately keep the automatic transmission 30 in the start stand-by state during a period since operation of the engine 12 is started until the engine 12 is restarted, thereby reducing the performance (pump capacity) required for the electromagnetic pump EMOP to reduce the size of the electromagnetic pump EMOP and hence the entire power transfer device 20. In the embodiment, the C1 switching valve 80, which switches the source of a hydraulic pressure to be supplied to the clutch C1 discussed above, is configured to supply the line pressure PL from the primary regulator valve 51 to the clutch C1 during an abnormality in which a hydraulic pressure is not supplied from the C1 linear solenoid valve SLC1 as normal.

Next, the C2/B3 switching valve 60, the B3 switching valve 70, and the C1 switching valve 80 discussed above will be described in detail.

As shown in FIG. 6, the C2/B3 switching valve 60 includes a spool 601 disposed in a valve body so as to be axially movable, a spring 602 that urges the spool 601, an input port 61 that communicates with an output port of the C2 linear solenoid valve SLC2 via an oil passage, a C2 drain port 62 capable of discharging a hydraulic pressure from the clutch C2, a B3 drain port 63 capable of discharging a hydraulic pressure from the brake B3, a signal pressure input port 64 that communicates with the drive range output port of the manual valve 53 via an oil passage, a line pressure input port 65 that communicates with the drive range output port of the manual valve 53 via an oil passage, a modulator pressure input port 66 that communicates with an output port of the modulator valve 52 via an oil passage, a first output port 67 that communicates with a hydraulic pressure entrance of the clutch C2 via an oil passage, a second output port 68 capable of supplying the C2 solenoid pressure Pslc2 from the C2 linear solenoid valve SLC2 to the brake B3, and a third output port 69. Further, a spring chamber 603 houses the spring 602 of the C2/B3 switching valve 60, and communicates with an output port of the solenoid valve S1 via a port and an oil passage (not shown).

In the embodiment, the state of attachment of the C2/B3 switching valve 60 is a B3 supply state (second state) in which the C2 solenoid pressure Pslc2 from the C2 linear solenoid valve SLC2 can be supplied to the brake B3 and a hydraulic pressure can be discharged from the clutch C2. That is, in the state of attachment of the C2/B3 switching valve 60 (B3 supply state), the spool 601 is urged by the spring 602 to be maintained in the state indicated by the dotted line in FIG. 6. This allows communication between the input port 61, which communicates with the output port of the C2 linear solenoid valve SLC2, and the second output port 68, allows communication between the first output port 67, which communicates with the hydraulic pressure entrance of the clutch C2, and the C2 drain port 62, and allows communication between the modulator pressure input port 66 and the third output port 69.

In addition, as discussed above, the signal pressure input port 64 of the C2/B3 switching valve 60 communicates with the drive range output port of the manual valve 53. When the line pressure PL is output from the primary regulator valve 51 with the forward travel shift range (drive range, 2nd-speed range, and L range) selected and with the oil pump 29 driven by power from the engine 12, the drive range pressure Pd from the manual valve 53, that is, the line pressure PL, is supplied to the signal pressure input port 64. Further, when the brake B3 is engaged (with engine brake at the first speed in operation) by supplying the C2 solenoid pressure Pslc2 from the C2 linear solenoid valve SLC2 to the brake B3 in order to transfer friction torque from the turbine runner 25 side to the output shaft 37 with the first speed established in the automatic transmission 30 as the L range is selected, the solenoid valve S1 discussed above is controlled by the speed change ECU 21 so as to output the solenoid pressure Ps1 serving as a signal pressure, and the solenoid pressure Ps1 from the solenoid valve S1 is supplied to the spring chamber 603 of the C2/B3 switching valve 60.

The spring constant of the spring 602 of the C2/B3 switching valve 60, the area of the pressure receiving surface of the spool 601 facing the signal pressure input port 64, and the area of the pressure receiving surface of the spool 601 which receives the urging force of the spring 602 and the solenoid pressure Ps1 from the solenoid valve S1 are determined such that the spool 601 is brought into the state indicated by the solid line in FIG. 6 with the thrust applied to the spool 601 by the effect of the line pressure PL from the signal pressure input port 64 exceeding the urging force of the spring 602 when the line pressure PL is supplied to the signal pressure input port 64 and the solenoid pressure Ps1 from the solenoid valve S1 is not supplied to the spring chamber 603, and such that the spool 601 is brought into the state indicated by the dotted line in FIG. 6 (B3 supply state) with the sum of the urging force of the spring 602 and the thrust applied to the spool 601 by the effect of the solenoid pressure Ps1 exceeding the thrust applied to the spool 601 by the effect of the line pressure PL when the solenoid pressure Ps1 is supplied to the spring chamber 603 with the line pressure PL supplied to the signal pressure input port 64.

Consequently, when the line pressure PL is supplied to the signal pressure input port 64 and the solenoid pressure Ps1 from the solenoid valve S1 is not supplied to the spring chamber 603, the spool 601 is moved against the urging force of the spring 602, and the C2/B3 switching valve 60 establishes the C2 supply state (first state) indicated by the solid line in FIG. 6. In the C2 supply state, the input port 61, which communicates with the output port of the C2 linear solenoid valve SLC2, and the first output port 67, which communicates with the hydraulic pressure entrance of the clutch C2, are communicated with each other, the B3 drain port 63, which can discharge a hydraulic pressure from the brake B3, and the second output port 68, which can supply the C2 solenoid pressure Pslc2 to the brake B3, are communicated with each other, and the line pressure input port 65 and the third output port 69 are communicated with each other. Consequently, if the C2 linear solenoid valve SLC2 is caused to output the C2 solenoid pressure Pslc2 when the C2/B3 switching valve 60 establishes the C2 supply state, the C2 solenoid pressure Pslc2 can be supplied to the clutch C2 to engage the clutch C2, and a hydraulic pressure can be discharged from the brake B3 as well.

Meanwhile, when the solenoid pressure Ps1 is supplied to the spring chamber 603 with the line pressure PL supplied to the signal pressure input port 64 in order to engage the brake B3 by supplying the C2 solenoid pressure Pslc2 from the C2 linear solenoid valve SLC2 to the brake B3 (with engine brake at the first speed in operation), the C2/B3 switching valve 60 establishes the B3 supply state indicated by the dotted line in FIG. 6. Consequently, the input port 61, which communicates with the output port of the C2 linear solenoid valve SLC2, and the second output port 68 are communicated with each other, and the first output port 67, which communicates with the hydraulic pressure entrance of the clutch C2, and the C2 drain port 62 are communicated with each other. Thus, the C2 solenoid pressure Pslc2 from the C2 linear solenoid valve SLC2 can be supplied to the brake B3, and a hydraulic pressure can be discharged from the clutch C2.

As shown in FIG. 6, the B3 switching valve 70 includes a plunger 700 disposed in a valve body so as to be axially movable, a spool 701 disposed in the valve body coaxially with the plunger 700 so as to be movable, a spring 702 that urges the spool 701, an input port 71 that communicates with the second output port 68 of the C2/B3 switching valve 60 via an oil passage, an output port 72 that communicates with a hydraulic pressure entrance of the brake B3 via an oil passage, a drain port 73 capable of discharging a hydraulic pressure from the brake B3, and a signal pressure input port 74 that communicates with the third output port 69 of the C2/B3 switching valve 60 via an oil passage. In addition, a spring chamber 703 houses the spring 702 of the B3 switching valve 70, and communicates with an output port of the lock-up solenoid valve SLU via a port and an oil passage (not shown).

In the embodiment, further, in order to provide the B3 switching valve 70 with the fail-safe function for suppressing simultaneous engagement of the brake B1 and the brake B3 discussed above, the plunger 700 and the spool 701 are configured to define an oil chamber 704. The oil chamber 704 is communicated with an output port of the B1 linear solenoid valve SLB1 which outputs (regulates) the B1 solenoid pressure Pslb1 which is a hydraulic pressure to be supplied to the brake B1 which is normally not engaged at the same time as the brake B3. The spool 701 includes a first pressure receiving surface 701a that receives the B1 solenoid pressure Pslb1 from the B1 linear solenoid valve SLB1, and a second pressure receiving surface 701b formed on the opposite side from the first pressure receiving surface 701a to receive the urging force of the spring 702. In addition, the plunger 700 includes a pressure receiving surface 700a that faces the first pressure receiving surface 701a of the spool 701 to receive the B1 solenoid pressure Pslb1 from the B1 linear solenoid valve SLB1, and a signal pressure receiving surface 700b formed on the opposite side from the pressure receiving surface 700a to receive a signal pressure supplied to the signal pressure input port 74. In the embodiment, the first pressure receiving surface 701a of the spool 701 and the pressure receiving surface 700a of the plunger 700 have the same area as each other.

In the embodiment, the state of attachment of the B3 switching valve 70 is a communicated state in which the C2 solenoid pressure Pslc2 from the C2 linear solenoid valve SLC2 can be supplied to the brake B3. That is, in the state of attachment of the B3 switching valve 70 (communicated state), the spool 701 and the plunger 700 are urged together by the spring 702 to be maintained in the state indicated by the dotted line in FIG. 6. This allows communication between the input port 71, which communicates with the second output port 68 of the C2/B3 switching valve 60, and the output port 72, which communicates with the hydraulic pressure entrance of the brake B3.

In addition, as discussed above, the signal pressure input port 74 of the B3 switching valve 70 communicates with the third output port 69 of the C2/B3 switching valve 60. When the C2/B3 switching valve 60 establishes the C2 supply state in which the C2 solenoid pressure Pslc2 from the C2 linear solenoid valve SLC2 can be supplied to the clutch C2, the drive range pressure Pd from the manual valve 53, that is, the line pressure PL, is supplied to the signal pressure input port 74. In addition, when the C2/B3 switching valve 60 establishes the B3 supply state in which the C2 solenoid pressure Pslc2 from the C2 linear solenoid valve SLC2 can be supplied to the brake B3, the modulator pressure Pmod from the modulator valve 52 is supplied to the signal pressure input port 74. In the embodiment, further, when the C2/B3 switching valve 60 is switched from the C2 supply state into the B3 supply state so that the C2 solenoid pressure Pslc2 from the C2 linear solenoid valve SLC2 is supplied to the brake B3, the solenoid valve S1 is controlled by the speed change ECU 21 so as to output the solenoid pressure Ps1 serving as a signal pressure for the C2/B3 switching valve 60, and the lock-up solenoid valve SLU is controlled by the speed change ECU 21 so as to output the lock-up solenoid pressure Pslu at a value P2 (see FIG. 7) that is higher than the lock-up clutch complete engagement pressure P1 discussed above determined in advance. When the C2 solenoid pressure Pslc2 from the C2 linear solenoid valve SLC2 is supplied to the brake B3, the lock-up solenoid pressure Pslu from the lock-up solenoid valve SLU is supplied to the spring chamber 703 of the B3 switching valve 70.

The spring constant of the spring 702 of the B3 switching valve 70, the area of the signal pressure receiving surface 700b of the plunger 700 facing the signal pressure input port 74, and the area of the second pressure receiving surface 701b of the spool 701 which receives the urging force of the spring 702 and the lock-up solenoid pressure Pslu from the lock-up solenoid valve SLU are determined such that the plunger 700 and the spool 701 are brought together into the state indicated by the solid line in FIG. 6 (blocked/discharge state) with the thrust applied to the plunger 700 by the effect of the line pressure PL on the signal pressure receiving surface 700b of the plunger 700 exceeding the sum of the urging force of the spring 702 applied to the spool 701 and the thrust applied to the spool 701 by the effect of the lock-up solenoid pressure Pslu on the second pressure receiving surface 701b when the line pressure PL is supplied to the signal pressure input port 74 as a signal pressure and the lock-up solenoid pressure Pslu (a hydraulic pressure that is equal to or less than the lock-up clutch complete engagement pressure P1) from the lock-up solenoid valve SLU is supplied to the spring chamber 703 as the lock-up clutch 28 executes lock-up, and such that the spool 701 and the plunger 700 are brought together into the state indicated by the dotted line in FIG. 6 (communicated state) with the sum of the urging force of the spring 702 applied to the spool 701 and the thrust applied to the spool 701 by the effect of the lock-up solenoid pressure Pslu exceeding the thrust applied to the plunger 700 by the effect of the modulator pressure Pmod when the modulator pressure Pmod is supplied to the signal pressure input port 74 and the lock-up solenoid pressure Pslu (a hydraulic pressure that is higher than the lock-up clutch complete engagement pressure P1) from the lock-up solenoid valve SLU is supplied to the spring chamber 703.

In the embodiment, further, the spring constant of the spring 702 of the B3 switching valve 70, the area of the first pressure receiving surface 701a of the spool 701 facing the oil chamber 704, and the area of the second pressure receiving surface 701b of the spool 701 which receives the urging force of the spring 702 and the lock-up solenoid pressure Pslu from the lock-up solenoid valve SLU are determined such that the spool 701 is brought into the state indicated by the solid line in FIG. 6 (blocked/discharge state) with the thrust applied to the spool 701 by the effect of the B1 solenoid pressure Pslb1 on the first pressure receiving surface 701a exceeding the sum of the urging force of the spring 702 applied to the spool 701 and the thrust applied to the spool 701 by the effect of the lock-up solenoid pressure Pslu from the lock-up solenoid valve SLU when the B1 solenoid pressure Pslb1 from the B1 linear solenoid valve SLB1 is supplied with the C2 solenoid pressure Pslc2 from the C2 linear solenoid valve SLC2 supplied to the brake B3 to engage the brake B3.

Consequently, when the line pressure PL is supplied to the signal pressure input port 74, that is, the C2/B3 switching valve 60 establishes the C2 supply state in which the C2 solenoid pressure Pslc2 from the C2 linear solenoid valve SLC2 can be supplied to the clutch C2 (during forward travel with engine brake at the first speed not in operation), the plunger 700 and the spool 701 are moved against the urging force of the spring 702, and the B3 switching valve 70 establishes the blocked/discharge state indicated by the solid line in FIG. 6. In the blocked/discharge state, the output port 72, which communicates with the hydraulic pressure entrance of the brake B3, is communicated with the drain port 73, and thus supply of the C2 solenoid pressure Pslc2 from the C2 linear solenoid valve SLC2 to the brake B3 can be blocked, and a hydraulic pressure can be discharged from the brake B3.

Then, even if the B1 solenoid pressure Pslb1 from the B1 linear solenoid valve SLB1 is supplied to the oil chamber 704 of the B3 switching valve 70 when the brake B1 is to be engaged with the C2/B3 switching valve 60 establishing the C2 supply state (with the brake B3 not engaged), that is, when the second speed or the fourth speed is to be established, or the lock-up solenoid pressure Pslu from the lock-up solenoid valve SLU (a hydraulic pressure equal to or less than the lock-up clutch complete engagement pressure P1) is supplied to the C2/B3 switching valve at the same time as the B1 solenoid pressure Pslb1 from the B1 linear solenoid valve SLB1 as the lock-up clutch 28 executes lock-up, movement of the plunger 700 and the spool 701 can be restricted by the line pressure PL which is high to more reliably maintain the B3 switching valve 70 in the blocked/discharge state.

When the C2 solenoid pressure Pslc2 from the C2 linear solenoid valve SLC2 is supplied to the brake B3 to engage the brake B3 (with engine brake at the first speed in operation), on the other hand, the modulator pressure Pmod, which is lower than the line pressure PL, is supplied from the third output port 69 of the C2/B3 switching valve 60 establishing the B3 supply state to the signal pressure input port 74 of the B3 switching valve 70, and the lock-up solenoid pressure Pslu from the lock-up solenoid valve SLU is supplied to the spring chamber 703. Consequently, the spool 701 and the plunger 700 are moved together with the sum of the urging force of the spring 702 applied to the spool 701 and the thrust applied to the spool 701 by the effect of the lock-up solenoid pressure Pslu exceeding the thrust applied to the plunger 700 by the modulator pressure Pmod, and thus the B3 switching valve 70 establishes the communicated state indicated by the dotted line in FIG. 5. In the communicated state, the output port 72, which communicates with the hydraulic pressure entrance of the brake B3, is communicated with the input port 71, which communicates with the second output port 68 of the C2/B3 switching valve 60, and thus the C2 solenoid pressure Pslc2 from the C2 linear solenoid valve SLC2 can be supplied to the brake B3.

In addition, when the B1 solenoid pressure Pslb1 from the B1 linear solenoid valve SLB1 is supplied to the oil chamber 704 when some abnormality occurs with the brake B3 thus engaged, the thrust applied to the spool 701 by the effect of the B1 solenoid pressure Pslb1 on the first pressure receiving surface 701a exceeds the sum of the urging force of the spring 702 applied to the spool 701 and the thrust applied to the spool 701 by the effect of the lock-up solenoid pressure Pslu, and thus the B3 switching valve 70 can be quickly switched from the communicated state into the blocked/discharge state with the spool 701 brought into the state indicated by the solid line in FIG. 6 by the B1 solenoid pressure Pslb1. Consequently, the output port 72 and the drain port 73 can be communicated with each other by the B1 solenoid pressure Pslb1 from the B1 linear solenoid valve SLB1 to discharge a hydraulic pressure from the brake B3, thereby quickly releasing engagement of the brake B3. Thus, according to the hydraulic control device 50, it is possible to favorably suppress simultaneous engagement of the brake B1 and the brake B3 by quickly releasing engagement of the brake B3 even if the B1 solenoid pressure Pslb1 from the B1 linear solenoid valve SLB1 is supplied to the oil chamber 704 because of some abnormality with the brake B3 engaged.

As shown in FIG. 5, the C1 switching valve 80 includes a spool 801 disposed in a valve body so as to be axially movable, a spring 802 that urges the spool 801, a first input port 81 that communicates with an output port of the C1 linear solenoid valve SLC1 via an oil passage, a second input port 82 that communicates with a discharge port of the electromagnetic pump EMOP via an oil passage L1, a holding pressure input port 83 that communicates with the third output port 69 of the C2/B3 switching valve 60 via an oil passage, a B1 solenoid pressure input port 84 that communicates with an output port of the B1 linear solenoid valve SLB1 via an oil passage, a line pressure input port 85 that communicates with the drive range output port of the manual valve 53 via an oil passage, a port 86 that communicates with the second output port 68 of the C2/B3 switching valve via an oil passage and that communicates with a spring chamber in which the spring 802 is disposed, a relay port 87 that can communicate with the line pressure input port 85, and an output port 88 that communicates with a hydraulic pressure entrance of the clutch C1 via an oil passage.

As shown in FIG. 5, the spool 801 of the C1 switching valve 80 includes a first pressure receiving surface 801a that receives the urging force of the spring 802, second pressure receiving surfaces 801b and 801c that are spaced from each other in the axial direction to face each other and that each receive the B1 solenoid pressure Pslb1 from the B1 linear solenoid valve SLB1, and a holding pressure receiving surface 801d that receives the line pressure PL or the modulator pressure Pmod serving as a holding pressure supplied from the third output port 69 of the C2/B3 switching valve 60. In the embodiment, of the second pressure receiving surfaces 801b and 801c which receive the B1 solenoid pressure Pslb1, the second pressure receiving surface 801c on the holding pressure receiving surface 801d side is larger in area than the second pressure receiving surface 801b on the first pressure receiving surface 801a side as shown in FIG. 5. In the hydraulic control device 50 according to the embodiment, further, an oil passage (first oil passage) L1 that connects between the discharge port of the electromagnetic pump EMOP and the second input port 82 of the C1 switching valve 80 and the relay port 87 of the C1 switching valve 80 are connected via an oil passage (second oil passage) L2 having a check valve 89 provided in the middle thereof. The check valve 89 allows entry of hydraulic oil (supply of a hydraulic pressure) from the relay port 87 into the oil passage L1, that is, the second input port 82, and restricts (prohibits) entry of hydraulic oil (supply of a hydraulic pressure) from the oil passage L1 into the oil passage L2, that is, the relay port 87.

In the embodiment, the state of attachment of the C1 switching valve 80 is the second supply state (the state in the left half in FIG. 5) in which the hydraulic pressure Pemop from the electromagnetic pump EMOP can be supplied to the clutch C1. That is, in the state of attachment of the C1 switching valve 80, the spool 801 is urged upward in the drawing by the urging force of the spring 802. This causes the spool 801 to close the first input port 81, which communicates with the output port of the C1 linear solenoid valve SLC1, allows communication between the second input port 82, which communicates with the discharge port of the electromagnetic pump EMOP via the oil passage L1, and the output port 88, which communicates with the hydraulic pressure entrance of the clutch C1, and allows communication between the line pressure input port 85 and the relay port 87. Consequently, when the C1 switching valve 80 establishes the second supply state, the hydraulic pressure Pemop from the electromagnetic pump EMOP can be supplied to the clutch C1 via the oil passage L1, the second input port 82, and the output port 88, and the line pressure PL from the manual valve 53 supplied to the line pressure input port 85 of the C1 switching valve 80 can be supplied to the clutch C1 via the oil passage L2 (check valve 89), a part of the oil passage L1, the second input port 82, and the output port 88.

When the line pressure PL is supplied to the signal pressure input port 64 of the C2/B3 switching valve 60 and the solenoid pressure Ps1 from the solenoid valve S1 is not supplied to the spring chamber 603, that is, during forward travel with engine brake at the first speed not in operation, the drive range pressure Pd from the manual valve 53, that is, the line pressure PL, is supplied as a holding pressure to the holding pressure input port 83 of the C1 switching valve 80 via the third output port 69 of the C2/B3 switching valve 60 establishing the C2 supply state. When the solenoid pressure Ps1 is supplied to the spring chamber 603 with the line pressure PL supplied to the signal pressure input port 64 of the C2/B3 switching valve 60, that is, with engine brake at the first speed in operation, on the contrary, the modulator pressure Pmod, which is lower than the line pressure PL, is supplied as a holding pressure to the holding pressure input port 83 of the C1 switching valve 80 via the third output port 69 of the C2/B3 switching valve 60 establishing the B3 supply state, and the C2 solenoid pressure Pslc2 from the C2 linear solenoid valve SLC2 is supplied to the port 86 (spring chamber) of the C1 switching valve 80 via the second output port 68 of the C2/B3 switching valve 60 establishing the B3 supply state. Further, when the brake B1 is engaged (when the second speed or the fourth speed is set) or when some abnormality occurs in the B1 linear solenoid valve SLB1 or the like, the B1 solenoid pressure Pslb1 from the B1 linear solenoid valve SLB1 is supplied to the B1 solenoid pressure input port 84 of the C1 switching valve 80.

The spring constant of the spring of the C1 switching valve 80 and the respective areas of the first pressure receiving surface 801a, the second pressure receiving surfaces 801b and 801c, and the holding pressure receiving surface 801d are determined such that the spool 801 is brought into the state in the right half in FIG. 5 (first supply state) with the force applied to the spool 801 by the effect of the line pressure PL on the holding pressure receiving surface 801d exceeding the sum of the force applied to the spool 801 by the effect of the B1 solenoid pressure Pslb1 on the second pressure receiving surfaces 801b and 801c and the urging force of the spring 802 applied to the spool 801 when the line pressure PL is supplied as a holding pressure from the C2/B3 switching valve 60 to the holding pressure input port 83, and such that the spool 801 is brought into the state in the right half in FIG. 5 (first supply state) with the force applied to the spool 801 by the effect of the modulator pressure Pmod on the holding pressure receiving surface 801d exceeding the sum of the urging force of the spring 802 applied to the spool 801 and the force applied to the spool 801 by the effect of the C2 solenoid pressure Pslc2 on the first pressure receiving surface 801a when the modulator pressure Pmod is supplied as a holding pressure from the C2/B3 switching valve 60 to the holding pressure input port 83.

In this way, when the C1 switching valve 80 establishes the first supply state, the first input port 81, which communicates with the output port of the C1 linear solenoid valve SLC1, and the output port 88, which communicates with the hydraulic pressure entrance of the clutch C1, are communicated with each other, the line pressure input port 85 is closed by the spool 801, and the second input port 82, which communicates with the discharge port of the electromagnetic pump EMOP, and the relay port 87 are communicated with the drain port. Consequently, when the C1 switching valve 80 establishes the first supply state, it is possible to supply the C1 solenoid pressure Pslc1 from the C1 linear solenoid valve SLC1 to the clutch C1 in order to engage the clutch C1, and not to supply the hydraulic pressure Pemop from the electromagnetic pump EMOP or the line pressure PL from the manual valve 53 (primary regulator valve 51) to the clutch C1.

In the embodiment, further, the spring constant of the spring of the C1 switching valve 80 and the respective areas of the first pressure receiving surface 801a, the second pressure receiving surfaces 801b and 801c, and the holding pressure receiving surface 801d are determined such that the spool 801 is brought into the state in the left half in FIG. 5 (second supply state) with the sum of the urging force of the spring 802 applied to the spool 801, the force applied to the spool 801 by the effect of the C2 solenoid pressure Pslc2 on the first pressure receiving surface 801a, and the force applied to the spool 801 by the effect of the B1 solenoid pressure Pslb1 on the second pressure receiving surfaces 801b and 801c exceeding the force applied to the spool 801 by the effect of the modulator pressure Pmod on the holding pressure receiving surface 801d when the B1 solenoid pressure Pslb1 from the B1 linear solenoid valve SLB1 is supplied to the B1 solenoid pressure input port 84 with the modulator pressure Pmod supplied as a holding pressure from the C2/B3 switching valve 60 to the holding pressure input port 83.

Subsequently, operation of the hydraulic control device 50 at the time when the forward travel shift range is selected by the driver of the automobile 10 incorporating the power transfer device 20 will be described.

When the forward travel shift range such as the drive range is selected by the driver, the engine 12 is in operation, and the oil pump 29 is driven by power from the engine 12, which causes the primary regulator valve 51 to generate the line pressure PL and causes the modulator valve 52 to generate the modulator pressure Pmod which is constant. Then, during forward travel with engine brake at the first speed not in operation with the hydraulic control device 50 operating normally, the drive range pressure Pd from the manual valve 53, that is, the line pressure PL, is supplied as a holding pressure to the holding pressure input port 83 of the C1 switching valve 80 via the third output port 69 of the C2/B3 switching valve 60 establishing the C2 supply state. Thus, when the line pressure PL is supplied as a holding pressure to the holding pressure input port 83, the C1 switching valve 80 establishes the first supply state in which the C1 solenoid pressure Pslc1 from the C1 linear solenoid valve SLC1 can be supplied to the clutch C1 irrespective of the presence or absence of the B1 solenoid pressure Pslb1 from the B1 linear solenoid valve SLB1, which makes it possible to supply the C1 solenoid pressure Pslc1 from the C1 linear solenoid valve SLC1 to the clutch C1 to engage the clutch C1.

With engine brake at the first speed in operation with the hydraulic control device 50 operating normally, meanwhile, the modulator pressure Pmod, which is lower than the line pressure PL, is supplied as a holding pressure to the holding pressure input port 83 of the C1 switching valve 80 via the third output port 69 of the C2/B3 switching valve 60 establishing the B3 supply state, and the C2 solenoid pressure Pslc2 from the C2 linear solenoid valve SLC2 is supplied to the port 86 (spring chamber) via the second output port 68 of the C2/B3 switching valve 60. Also when the modulator pressure Pmod, which is lower than the line pressure PL, is thus supplied as a holding pressure to the holding pressure input port 83, the C1 switching valve 80 establishes the first supply state unless the B1 solenoid pressure Pslb1 from the B1 linear solenoid valve SLB1 is supplied to the B1 solenoid pressure input port 84, which makes it possible to supply the C1 solenoid pressure Pslc1 from the C1 linear solenoid valve SLC1 to the clutch C1 to engage the clutch C1.

If the line pressure PL is thus supplied as a holding pressure to the C1 switching valve 80 when the C1 solenoid pressure Pslc1 is supplied from the C1 linear solenoid valve SLC1 as normal, the C1 switching valve 80 is maintained in the first supply state irrespective of the presence or absence of the B1 solenoid pressure Pslb1 from the B1 linear solenoid valve SLB1, and the C1 switching valve 80 is maintained in the first supply state even if the modulator pressure Pmod is supplied as a holding pressure unless the B1 solenoid pressure Pslb1 from the B1 linear solenoid valve SLB1 is supplied. Thus, in the hydraulic control device 50 according to the embodiment, it is possible to more reliably suppress communication between the line pressure input port 85 and the relay port 87 with the C1 switching valve 80 switched from the first supply state into the second supply state when the C1 solenoid pressure Pslc1 is supplied from the C1 linear solenoid valve SLC1 as normal. As a result, it is possible to favorably suppress occurrence of a shock along with switching in supplied hydraulic pressure by suppressing erroneous supply of the line pressure PL from the manual valve 53 (primary regulator valve 51) to the clutch C1 when the C1 solenoid pressure Pslc1 is supplied from the C1 linear solenoid valve SLC1 as normal, and to favorably suppress application of the line pressure to the electromagnetic pump EMOP via the oil passage L2 (check valve 89) and the oil passage L1 to adversely affect the electromagnetic pump EMOP (internal constituent part).

On the other hand, when the automobile 10 is stationary to wait for a traffic light to change, for example, the engine ECU 14 executes the automatic start/stop control process to stop operation of the engine 12. In this event, because drive of the oil pump 29 is stopped as operation of the engine 12 is stopped, the line pressure PL and the modulator pressure Pmod are reduced, and also the C1 linear solenoid valve SLC1 corresponding to the clutch C1 serving as a starting clutch that is engaged to establish the first speed (and the second speed) in the automatic transmission 30 becomes unable to generate a hydraulic pressure (C1 solenoid pressure Pslc1). Therefore, the state of attachment of the C1 switching valve 80 according to the embodiment is the second supply state in which the hydraulic pressure Pemop from the electromagnetic pump EMOP can be supplied to the clutch C1. That is, when drive of the oil pump 29 is stopped, the line pressure PL or the modulator pressure Pmod supplied to the holding pressure input port 83 of the C1 switching valve 80 is reduced, and thus the C1 switching valve 80 is returned to its state of attachment (second supply state) by the urging force of the spring 802, thereby allowing communication between the second input port 82, which communicates with the discharge port of the electromagnetic pump EMOP via the oil passage L1, and the output port 88, which communicates with the hydraulic pressure entrance of the clutch C1.

Consequently, the hydraulic pressure Pemop from the electromagnetic pump EMOP can be supplied to the clutch C1 via the C1 switching valve 80, and the hydraulic pressure Pemop from the electromagnetic pump EMOP can be supplied to the clutch C1 serving as a starting clutch to keep the automatic transmission 30 in the start stand-by state even if operation of the engine 12 is stopped when the forward travel shift range such as the drive range is selected by the driver. In the automobile 10 according to the embodiment, when the engine 12 is in operation and the forward travel shift range such as the drive range is selected, no hydraulic pressure is generated by the electromagnetic pump EMOP. When the engine 12 is restarted and the oil pump 29 is driven by power from the engine 12, meanwhile, the C1 switching valve 80 is switched from the second supply state into the first supply state by the line pressure PL or the modulator pressure Pmod supplied as a holding pressure.

Here, in the hydraulic control device 50 discussed above, when an abnormality occurs in the state of supply of the C1 solenoid pressure Pslc1 from the C1 linear solenoid valve SLC1 such as a failure of the C1 linear solenoid valve SLC1 or a blockage in an oil passage between the output port of the C1 linear solenoid valve SLC1 and the first input port 81 of the C1 switching valve 80, the C1 solenoid pressure Pslc1 may not be supplied to the clutch C1. Thus, if no measures are taken, the clutch C1 may not be engaged during an abnormality in which a hydraulic pressure is not supplied from the C1 linear solenoid valve SLC1 as normal, which may constitute obstacles to start and travel of the automobile 10.

Therefore, the speed change ECU 21 according to the embodiment determines whether or not an abnormality occurs in the state of supply of the C1 solenoid pressure Pslc1 from the C1 linear solenoid valve SLC1 on the basis of a value detected by a pressure sensor (not shown) or the like while an ignition switch of the automobile 10 is turned on. If it is determined that an abnormality occurs in the state of supply of the C1 solenoid pressure Pslc1, and on condition that the engine 12 is in operation, that is, the oil pump 29 is driven, the speed change ECU 21 controls the solenoid valve S1 so as to output the solenoid pressure Ps1 if the solenoid pressure Ps1 serving as a signal pressure for the C2/B3 switching valve 60 and the lock-up relay valve 56 is not output from the solenoid valve S1 (with engine brake at the first speed not in operation), and controls the B1 linear solenoid valve SLB1, which has a relatively low normally used upper limit pressure, so as to output the B1 solenoid pressure (switching pressure) Pslb1 at a value (maximum output pressure, for example) that is more than the normally used upper limit pressure and the modulator pressure Pmod and that is equal to or less than the maximum output pressure of the B1 linear solenoid valve SLB1.

By thus controlling the solenoid valve S1 and the B1 linear solenoid valve SLB1, the C2/B3 switching valve 60 establishes the B3 supply state, and the modulator pressure Pmod, which is lower than the line pressure PL, is supplied as a holding pressure to the holding pressure input port 83 of the C1 switching valve 80, the C2 solenoid pressure Pslc2 from the C2 linear solenoid valve SLC2 is supplied to the port 86 (spring chamber), and the B1 solenoid pressure Pslb1 (switching pressure) from the B1 linear solenoid valve SLB1 is supplied to the B1 solenoid pressure input port 84. Then, the C1 switching valve 80 establishes the first supply state discussed above with the sum of the urging force of the spring 802 applied to the spool 801, the force applied to the spool 801 by the effect of the C2 solenoid pressure Pslc2 on the first pressure receiving surface 801a, and the force applied to the spool 801 by the effect of the B1 solenoid pressure Pslb1 on the second pressure receiving surfaces 801b and 801c exceeding the force applied to the spool 801 by the effect of the modulator pressure Pmod on the holding pressure receiving surface 801d.

Consequently, the line pressure PL from the manual valve 53 supplied to the line pressure input port 85 of the C1 switching valve 80 can be supplied to the clutch C1 via the relay port 87, the oil passage L2 (check valve 89), a part of the oil passage L1, the second input port 82, and the output port 88 to engage the clutch C1. In addition, since the line pressure PL from the manual valve 53 supplied to the line pressure input port 85 can be thus supplied to the clutch C1 utilizing a part of the oil passage L1 which connects between the electromagnetic pump EMOP and the C1 switching valve 80, it is possible to suppress an increase in number of oil passages and hence an increase in cost and device size. When the B1 solenoid pressure Pslb1 is set to the switching pressure discussed above, the B1 solenoid pressure Pslb1 is supplied as the maximum pressure Pmax from the shuttle valve 54 to the primary regulator valve 51, and thus the line pressure PL itself generated by the primary regulator valve 51 is also increased.

As a result, in the automobile 10 incorporating the power transfer device 20, even if an abnormality in which a hydraulic pressure is not supplied from the C1 linear solenoid valve SLC1 to the clutch C1 as normal during travel at the first speed, the second speed can be established by the automatic transmission 30 by controlling the solenoid valve S1 and the B1 linear solenoid valve SLB1 as discussed above, which satisfactorily ensures forward travel of the automobile 10. Even if an abnormality in which a hydraulic pressure is not supplied from the C1 linear solenoid valve SLC1 to the clutch C1 as normal during travel at the second speed, in addition, the second speed can be continuously established by the automatic transmission 30 by controlling the solenoid valve S1 as discussed above and increasing the B1 solenoid pressure Pslb1 from the B1 linear solenoid valve SLB1 to the switching pressure described above, which satisfactorily ensures forward travel of the automobile 10.

Even if an abnormality in which a hydraulic pressure is not supplied from the C1 linear solenoid valve SLC1 to the clutch C1 as normal during travel at the third speed, further, the C2/B3 switching valve 60 can be switched from the C2 supply state into the B3 supply state by controlling the solenoid valve S1 and the B1 linear solenoid valve SLB1 as discussed above, and the B3 switching valve 70 can be switched into the blocked/discharge state by inputting the B1 solenoid pressure Pslb1 from the B1 linear solenoid valve SLB1. Consequently, the second speed is set by the automatic transmission 30 with engagement of the clutch C2 released and engagement of the brake B3 blocked, which satisfactorily ensures forward travel of the automobile 10. When an abnormality in which a hydraulic pressure is not supplied from the C1 linear solenoid valve SLC1 to the clutch C1 as normal during travel at the fourth speed, moreover, the second speed can be established by the automatic transmission 30 by controlling the solenoid valve S1 as discussed above and increasing the B1 solenoid pressure Pslb1 from the B1 linear solenoid valve SLB1 to the switching pressure described above when the vehicle speed (the rotational speed of the engine 12) is reduced to some degree, which satisfactorily ensures forward travel of the automobile 10. Even if an abnormality in which a hydraulic pressure is not supplied from the C1 linear solenoid valve SLC1 to the clutch C1 as normal before the automobile 10 becomes stationary or while the automobile 10 is stationary, the second speed can be established by the automatic transmission 30 by controlling the solenoid valve S1 and the B1 linear solenoid valve SLB1 as discussed above, which satisfactorily ensures start of the automobile 10.

As has been described above, the hydraulic control device 50 according to the embodiment includes the C1 switching valve 80 which is capable of establishing the first supply state, in which the C1 solenoid pressure Pslc1 from the C1 linear solenoid valve SLC1 can be supplied to the clutch C1, and the second supply state, in which the line pressure PL from the manual valve 53 (primary regulator valve 51) can be supplied to the clutch C1, which selectively receives the line pressure (first hydraulic pressure) PL and the modulator pressure (second hydraulic pressure) Pmod as a holding pressure for holding the first supply state, and which can receive the B1 solenoid pressure Pslb1 from the B1 linear solenoid valve SLB1 corresponding to the brake B1 which is engaged at the same time as the clutch C1 when an abnormality in which a hydraulic pressure is not supplied from the C1 linear solenoid valve SLC1 as normal. In addition, the C1 switching valve 80 establishes the first supply state irrespective of the presence or absence of the B1 solenoid pressure Pslb1 from the B1 linear solenoid valve SLB1 when the line pressure PL is supplied as a holding pressure, establishes the first supply state when the modulator pressure Pmod is supplied as a holding pressure and the B1 solenoid pressure Pslb1 from the B1 linear solenoid valve SLB1 is not supplied, and establishes the second supply state when the modulator pressure Pmod is supplied as a holding pressure and the B1 solenoid pressure Pslb1 from the B1 linear solenoid valve SLB1 is supplied. Then, during an abnormality in which a hydraulic pressure is not supplied from the C1 linear solenoid valve SLC1 as normal, the modulator pressure Pmod which is lower than the line pressure is supplied as a holding pressure to the C1 switching valve 80.

By thus supplying the modulator pressure Pmod, which is lower than the line pressure PL, as a holding pressure to the C1 switching valve 80 during the abnormality described above, the C1 switching valve 80 can be quickly switched from the first supply state into the second supply state by the B1 solenoid pressure Pslb1 from the B1 linear solenoid valve SLB1 to supply the line pressure PL from the primary regulator valve 51 to the clutch C1, which enables simultaneous engagement of the clutch C1 and the brake B1. If the line pressure PL is supplied as a holding pressure to the C1 switching valve 80 when the C1 solenoid pressure Pslc1 is supplied from the C1 linear solenoid valve SLC1 as normal, meanwhile, the C1 switching valve 80 is maintained in the first supply state irrespective of the presence or absence of the B1 solenoid pressure Pslb1 from the B1 linear solenoid valve SLB1, and the C1 switching valve 80 is maintained in the first supply state even if the modulator pressure Pmod is supplied as a holding pressure with engine brake at the first speed in operation unless the B1 solenoid pressure Pslb1 from the B1 linear solenoid valve SLB1 is supplied. Thus, with the hydraulic control device 50 according to the embodiment, it is possible to supply the line pressure PL from the primary regulator valve 51 to the clutch C1 corresponding to the C1 linear solenoid valve SLC1 during an abnormality in which a hydraulic pressure is not supplied from the C1 linear solenoid valve SLC1 as normal, and not to supply the line pressure PL from the primary regulator valve 51 to the clutch C1 when the C1 solenoid pressure Pslc1 is supplied from the C1 linear solenoid valve SLC1 as normal. As a result, it is possible to favorably suppress occurrence of a shock along with switching in supplied hydraulic pressure by suppressing erroneous supply of the line pressure PL from the primary regulator valve 51 to the clutch C1 when the C1 solenoid pressure Pslc1 is supplied from the C1 linear solenoid valve SLC1 as normal. Then, by basically supplying the line pressure PL to the C1 switching valve 80 as a holding pressure when a hydraulic pressure is supplied from the C1 linear solenoid valve SLC1 as normal, it is possible to more reliably maintain the C1 switching valve 80 in the first supply state, and not to supply the line pressure PL from the primary regulator valve 51 to the clutch C1.

Further, in the hydraulic control device 50 according to the embodiment, during an abnormality in which the C1 solenoid pressure Pslc1 is not supplied from the C1 linear solenoid valve SLC1 as normal, the C2/B3 switching valve 60 establishes the second state using the solenoid pressure (signal pressure) Ps1 from the solenoid valve S1. Consequently, the C2 solenoid pressure Pslc2 from the C2 linear solenoid valve SLC2 can be supplied to the brake B3, and a hydraulic pressure can be discharged from the clutch C2, which allows the modulator pressure Pmod to be supplied as a holding pressure from the C2/B3 switching valve 60 to the C1 switching valve 80 and allows the modulator pressure Pmod to be supplied as a signal pressure to the B3 switching valve 70. This enables the modulator pressure, which is lower than the line pressure PL, to be supplied as a holding pressure to the C1 switching valve 80 during the abnormality described above. When the C2/B3 switching valve 60 establishes the second state, in addition, the C2 solenoid pressure Pslc2 from the C2 linear solenoid valve SLC2 can be supplied to the brake B3, and the B3 switching valve 70 is supplied with the modulator pressure Pmod as a signal pressure to establish the communicated state in which the C2 solenoid pressure Pslc2 from the C2 linear solenoid valve SLC2 can be supplied to the brake B3. When the B1 solenoid pressure Pslb1 from the B1 linear solenoid valve SLB1 is supplied to the B3 switching valve 70 in the communicated state, however, the B3 switching valve 70 establishes the blocked/discharge state in which supply of a hydraulic pressure from the C2 linear solenoid valve SLC2 to the brake B3 is blocked and a hydraulic pressure can be discharged from the brake B3. Thus, even if the B1 solenoid pressure Pslb1 is output from the B1 linear solenoid valve SLB1 as a hydraulic pressure is no longer supplied from the C1 linear solenoid valve SLC1 as normal, the brake B1 and the brake B3 are not engaged at the same time as each other.

In the embodiment described above, in addition, the C1 switching valve 80 includes the spool 801 disposed so as to be axially movable and capable of establishing the first supply state and the second supply state, and the spring 802 which urges the spool 801, and the spool 801 includes the first pressure receiving surface 801a which receives the urging force of the spring 802, the second pressure receiving surfaces 801b and 801c which are spaced from each other in the axial direction to face each other and which each receive the B1 solenoid pressure Pslb1 from the B1 linear solenoid valve SLB1, and the holding pressure receiving surface 801d which receives the line pressure PL or the modulator pressure Pmod serving as a holding pressure. When the C2/B3 switching valve 60 establishes the second state described above, the C2 solenoid pressure Pslc2 from the C2 linear solenoid valve SLC2 is applied to the first pressure receiving surface 801a of the spool 801 of the C1 switching valve 80.

Consequently, during an abnormality in which the C1 solenoid pressure Pslc1 is not supplied from the C1 linear solenoid valve SLC1 as normal, the C2 solenoid pressure Pslc2 from the C2 linear solenoid valve SLC2 is applied to the first pressure receiving surface 801a of the spool 801. Thus, the C1 switching valve 80 establishes the second supply state with the sum of the thrust applied to the spool 801 by the effect of the C2 solenoid pressure Pslc2 on the first pressure receiving surface 801a, the thrust applied to the spool 801 by the effect of the B1 solenoid pressure Pslb1 on the second pressure receiving surfaces 801b and 801c, and the urging force of the spring 802 applied to the spool 801 exceeding the thrust applied to the spool 801 by the effect of the modulator pressure Pmod on the holding pressure receiving surface. Thus, with the hydraulic control device 50 according to the embodiment, it is possible to reduce the urging force (rigidity) required for the spring 802 when the C1 switching valve 80 is brought into the second supply state, which allows the C1 switching valve 80 to be more reliably maintained in the first supply state by the line pressure PL or the modulator pressure Pmod supplied as a holding pressure to the C1 switching valve 80 when the C1 solenoid pressure Pslc1 is supplied from the C1 linear solenoid valve SLC1 as normal. It should be noted, however, that the C2 solenoid pressure Pslc2 from the C2 linear solenoid valve SLC2 may not be applied to the first pressure receiving surface 801a of the spool 801, depending on the rigidity of the spring 802. Instead of forming the second pressure receiving surfaces 801b and 801c on the spool 801, the C1 switching valve 80 may be configured such that the B1 solenoid pressure Pslb1 from the B1 linear solenoid valve SLB1 is supplied to the port 86 (spring chamber) so that the first pressure receiving surface 801a of the spool 801 also serves as the second pressure receiving surface which receives the B1 solenoid pressure Pslb1 from the B1 linear solenoid valve SLB1.

In the embodiment described above, further, the clutch C1 is engaged at least when the first speed and the second speed are established in the automatic transmission 30, and the brake B1 is engaged at least when the second speed is established in the automatic transmission 30. Thus, with the hydraulic control device 50 according to the embodiment described above, during an abnormality in which the C1 solenoid pressure Pslc1 is not supplied from the C1 linear solenoid valve SLC1 as normal, start and forward travel of the vehicle at the second speed can be ensured by engaging the clutch C1 using the line pressure PL from the primary regulator valve 51, and engaging the brake B1.

With the hydraulic control device 50 according to the embodiment, when the C1 solenoid pressure Pslc1 for the clutch C1 is no longer supplied by the C1 linear solenoid valve SLC1 with operation of the engine 12 stopped and with the oil pump 29 no longer generating a hydraulic pressure, the hydraulic pressure Pemop from the electromagnetic pump EMOP can be supplied to the clutch C1 by switching the C1 switching valve 80 into the second supply state and actuating the electromagnetic pump EMOP. In addition, since the line pressure PL from the primary regulator valve 53 can be supplied to the clutch C1 utilizing a part of the oil passage L1 which connects between the electromagnetic pump EMOP and the C1 switching valve 80, it is possible to suppress an increase in number of oil passages and hence an increase in cost and device size. With the hydraulic control device 50 according to the embodiment described above, it is possible to suppress erroneous supply of the line pressure PL from the primary regulator valve 51 to the clutch C1 when the C1 solenoid pressure Pslc1 is supplied from the C1 linear solenoid valve SLC1 as normal as discussed above, and thus to favorably suppress application of the line pressure PL to the electromagnetic pump EMOP via the oil passage L2 and the oil passage L1, which adversely affects the electromagnetic pump EMOP, when the C1 solenoid pressure Pslc1 is supplied from the C1 linear solenoid valve SLC1 as normal.

While using the electromagnetic pump EMOP as in the embodiment described above enables a reduction in size of the hydraulic control device 50 and hence the entire power transfer device 20, it should be understood that an electric pump may be used in place of the electromagnetic pump EMOP. In the hydraulic control device 50 according to the embodiment, the check valve 89 is provided in the oil passage L2. In place of the check valve 89, however, an on-off valve that is opened when it is determined that an abnormality has occurred in the state of supply of the C1 solenoid pressure Pslc1 from the C1 linear solenoid valve SLC1, for example, may be disposed in the oil passage L2.

Here, the correspondence between the main elements of the embodiment and the main elements of the invention described in the "SUMMARY OF THE INVENTION" section will be described. In the embodiment described above, the hydraulic control device 50 of the automatic transmission 30 capable of transferring power applied to the front cover 18 to the output shaft 37 at a speed change ratio that is changeable in a plurality of stages by engaging and disengaging the plurality of clutches C1 and C2 and the brake B1 etc. corresponds to the "hydraulic control device". The C1 linear solenoid valve SLC1 which regulates the C1 solenoid pressure Pslc1 to be supplied to the clutch C1 corresponds to the "first pressure regulation valve". The B1 linear solenoid valve SLB1 which regulates the B1 solenoid pressure Pslb1 to be supplied to the brake B1 which is engaged at the same time as the clutch C1 during an abnormality in which the C1 solenoid pressure Pslc1 is not supplied from the C1 linear solenoid valve SLC1 as normal corresponds to the "second pressure regulation valve". The primary regulator valve 51 which regulates a hydraulic pressure from the oil pump 29 to generate the line pressure PL corresponds to the "line pressure generation valve". The C1 switching valve 80 which is capable of establishing the first supply state, in which the C1 solenoid pressure Pslc1 from the C1 linear solenoid valve SLC1 can be supplied to the clutch C1, and the second supply state, in which the line pressure PL from the primary regulator valve 51 can be supplied to the clutch C1, and which can receive the line pressure PL or the modulator pressure Pmod serving as a holding pressure for holding the first supply state and a hydraulic pressure from the B1 linear solenoid valve SLB1 corresponds to the "switching valve". The C2 linear solenoid valve SLC2 which regulates the C2 solenoid pressure Pslc2 to be supplied to the brake B3 which is normally not engaged at the same time as the brake B1 corresponds to the "third pressure regulation valve". The B3 switching valve 70 which is capable of establishing the blocked/discharge state, in which supply of the C2 solenoid pressure Pslc2 from the C2 linear solenoid valve SLC2 to the brake B3 is blocked and a hydraulic pressure can be discharged from the brake B3, and the communicated state, in which the C2 solenoid pressure Pslc2 from the C2 linear solenoid valve SLC2 can be supplied to the brake B3, and which can receive the line pressure PL or the modulator pressure Pmod serving as a signal pressure for establishing the blocked/discharge state and the communicated state and the B1 solenoid pressure Pslb1 from the B1 linear solenoid valve SLB1 corresponds to the "second switching valve". The C2/B3 switching valve 60 which is capable of establishing the first state, in which the C2 solenoid pressure Pslc2 from the C2 linear solenoid valve SLC2 can be supplied to the clutch C2 which is not engaged at the same time as the brake B3, and the second state, in which the C2 solenoid pressure from the C2 linear solenoid valve SLC2 can be supplied to the brake B3 and a hydraulic pressure can be discharged from the clutch C2, corresponds to the "third switching valve". The solenoid valve S1 which outputs the solenoid pressure Ps1 serving as a signal pressure for switching the C2/B3 switching valve 60 from the first state into the second state when the C2 solenoid pressure Pslc2 from the C2 linear solenoid valve SLC2 is supplied to the brake B3 and during the abnormality described above corresponds to the "signal pressure output valve". The spool 801 disposed so as to be axially movable and capable of establishing the first supply state and the second supply state corresponds to the "spool". The spring 802 which urges the spool 801 corresponds to the "spring". The first pressure receiving surface 801a which receives the urging force of the spring 802 corresponds to the "first pressure receiving surface". The second pressure receiving surfaces 801b and 801c which receive the B1 solenoid pressure Pslb1 from the B1 linear solenoid valve SLB1 correspond to the "second pressure receiving surface". The holding pressure receiving surface 801d which receives the line pressure PL or the modulator pressure Pmod as a holding pressure corresponds to the "holding pressure receiving surface". The electromagnetic pump EMOP driven by electric power corresponds to the "second hydraulic pressure generation source". The oil pump 29 which is mechanical and driven by power from the engine 12 corresponds to the "hydraulic pressure generation source" and the "mechanical pump". The oil passage L1 corresponds to the "first oil passage". The oil passage L2 corresponds to the "second oil passage". The check valve 89 corresponds to the "valve".

The correspondence between the main elements of the embodiment etc. and the main elements of the invention described in the "SUMMARY OF THE INVENTION" section does not limit the elements of the invention described in the "SUMMARY OF THE INVENTION" section, because the embodiment etc. are examples given for the purpose of specifically describing the invention described in the "SUMMARY OF THE INVENTION" section. That is, the embodiment etc. are merely specific examples of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

The present invention can be utilized in the hydraulic control device manufacturing industry.

What is claimed is:

1. A hydraulic control device for a speed change device capable of transferring power applied to an input member to an output member at a speed change ratio that is changeable in a plurality of stages by engaging and disengaging a plurality of hydraulic friction engagement elements, the hydraulic control device comprising:
   a first pressure regulation valve that regulates a hydraulic pressure to be supplied to a first hydraulic friction engagement element;
   a second pressure regulation valve that regulates a hydraulic pressure to be supplied to a second hydraulic friction engagement element;
   a line pressure generation valve that regulates a hydraulic pressure from a hydraulic pressure generation source to generate a line pressure; and
   a switching valve that can establish a first supply state, in which the hydraulic pressure from the first pressure regulation valve can be supplied to the first hydraulic friction engagement element when the first pressure regulation valve is normal, and that can establish a second supply state, in which the line pressure from the line pressure generation valve can be supplied to the first hydraulic friction engagement element during an abnormality in which a hydraulic pressure is not supplied from the first pressure regulation valve as normal, wherein the switching valve is selectively supplied with a first hydraulic pressure and a second hydraulic pressure that is lower than the first hydraulic pressure as a holding pressure, and supplied with the second hydraulic pressure as the holding pressure and supplied with the hydraulic pressure from the second pressure regulation valve during the abnormality, and the switching valve establishes the first supply state, irrespective of presence or absence of the hydraulic pressure from the second pressure regulation valve, when the first hydraulic pressure is supplied as the holding pressure, establishes the first supply state when the second hydraulic pressure is supplied as the holding pressure and the hydraulic pressure from the second pressure regulation valve is not supplied, and establishes the second supply state when the second hydraulic pressure is supplied as the holding pressure and the hydraulic pressure from the second pressure regulation valve is supplied.

2. The hydraulic control device according to claim 1, wherein
the first hydraulic pressure is the line pressure, and the second hydraulic pressure is a modulator pressure obtained by reducing the line pressure.

3. The hydraulic control device according to claim 2, further comprising:
   a third pressure regulation valve that regulates a hydraulic pressure to be supplied to a third hydraulic friction engagement element that is normally not engaged at the same time as the second hydraulic friction engagement element;
   a second switching valve that can establish a blocked/discharge state, in which supply of the hydraulic pressure from the third pressure regulation valve to the third hydraulic friction engagement element is blocked and a hydraulic pressure can be discharged from the third hydraulic friction engagement element, and a communicated state, in which the hydraulic pressure from the third pressure regulation valve can be supplied to the third hydraulic friction engagement element, and that can receive a signal pressure for establishing the blocked/discharge state and the communicated state and a hydraulic pressure from the second pressure regulation valve;
   a third switching valve that can establish a first state, in which the hydraulic pressure from the third pressure regulation valve can be supplied to a fourth hydraulic friction engagement element that is normally not engaged at the same time as the third hydraulic friction engagement element, and a second state, in which the hydraulic pressure from the third pressure regulation valve can be supplied to the third hydraulic friction engagement element and a hydraulic pressure can be discharged from the fourth hydraulic friction engagement element; and
   a signal pressure output valve that outputs a signal pressure for switching the third switching valve from the first state into the second state when the hydraulic pressure from the third pressure regulation valve is supplied to the third hydraulic friction engagement element and during the abnormality, wherein
the third switching valve can receive the line pressure and the modulator pressure, and supplies the line pressure to the switching valve as the holding pressure and supplies the line pressure to the second switching valve as the signal pressure when the first state is established, and supplies the modulator pressure to the switching valve as the holding pressure and supplies the modulator pressure to the second switching valve as the signal pressure when the second state is established, and the second switching valve establishes the blocked/discharge state when the line pressure is supplied as the signal pressure, establishes the communicated state when the modulator pressure is supplied as the signal pressure, and establishes the blocked/discharge state when a hydraulic pressure from the second pressure regulation valve is input in the communicated state.

4. The hydraulic control device according to claim 3, wherein the switching valve includes a spool disposed so as to be axially movable and capable of establishing the first supply state and the second supply state, and a spring that urges the spool, and the spool includes a first pressure receiving surface that receives an urging force of the spring, a second pressure receiving surface that receives the hydraulic pressure from the second pressure regulation valve, and a holding pressure receiving surface that receives the holding pressure.

5. The hydraulic control device according to claim 4, wherein the hydraulic pressure from the third pressure regulation valve is applied to the first pressure receiving surface of the spool when the third switching valve establishes the second state.

6. The hydraulic control device according to claim 1, the first hydraulic friction engagement element is engaged at least when the first speed and the second speed are established in the speed change device, and the second hydraulic friction engagement element is engaged at least when the second speed is established in the speed change device.

7. The hydraulic control device according to claim 1, further comprising a second hydraulic pressure generation source driven by electric power, wherein the hydraulic pressure generation source is a mechanical pump driven by power from a motor, the first pressure regulation valve regulates the line pressure from the line pressure generation valve to generate the hydraulic pressure to be supplied to the first hydraulic friction engagement element, the switching valve is configured to receive a hydraulic pressure from the second hydraulic pressure generation source via a first oil passage, and to supply the hydraulic pressure from the second hydraulic pressure generation source to the first hydraulic friction engagement element when the second supply state is established, and when the switching valve establishes the second supply state, the line pressure from the line pressure generation valve is supplied to the first hydraulic friction engagement element by way of a second oil passage and the first oil passage, the second oil passage being connected to the first oil passage and having a valve provided in a middle of the second oil passage, the valve being configured to restrict entry of the hydraulic pressure from the second hydraulic pressure generation source.

8. The hydraulic control device according to claim 7, wherein the second hydraulic pressure generation source is an electric pump driven by electric power or an electromagnetic pump.

* * * * *